Aug. 25, 1964   C. N. HANNON ETAL   3,145,516
APPARATUS FOR THE PACKAGING OF NEWSPAPERS OR THE LIKE
Filed March 6, 1961   8 Sheets-Sheet 1
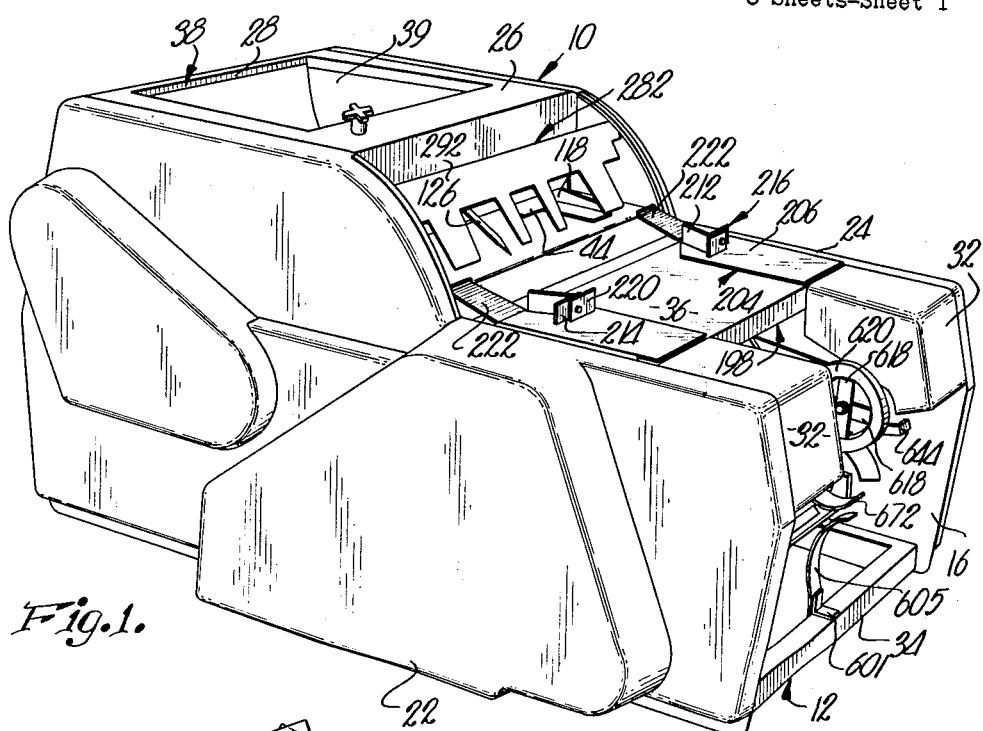
Fig. 1.
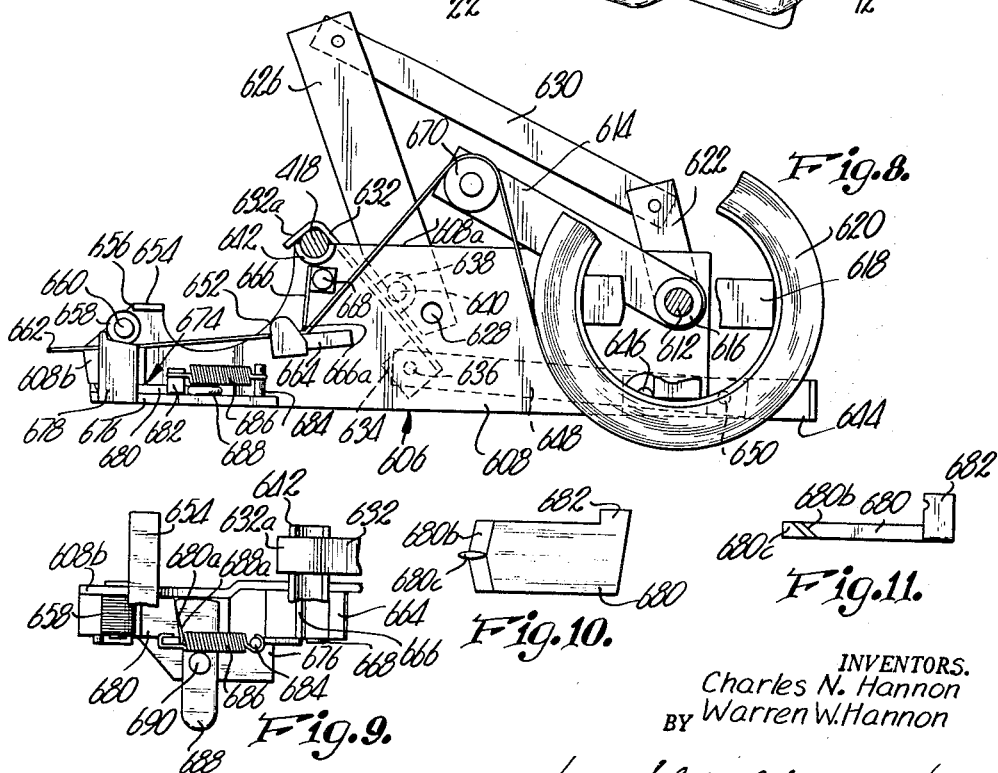
Fig. 8.
Fig. 9.   Fig. 10.   Fig. 11.
INVENTORS.
Charles N. Hannon
BY Warren W. Hannon
Hovey, Schmidt, Johnson & Hovey
ATTORNEYS.

Aug. 25, 1964  C. N. HANNON ETAL  3,145,516
APPARATUS FOR THE PACKAGING OF NEWSPAPERS OR THE LIKE
Filed March 6, 1961  8 Sheets-Sheet 2

INVENTORS.
Charles N. Hannon
BY Warren W. Hannon

Hovey, Schmidt, Johnson & Hovey
ATTORNEYS.

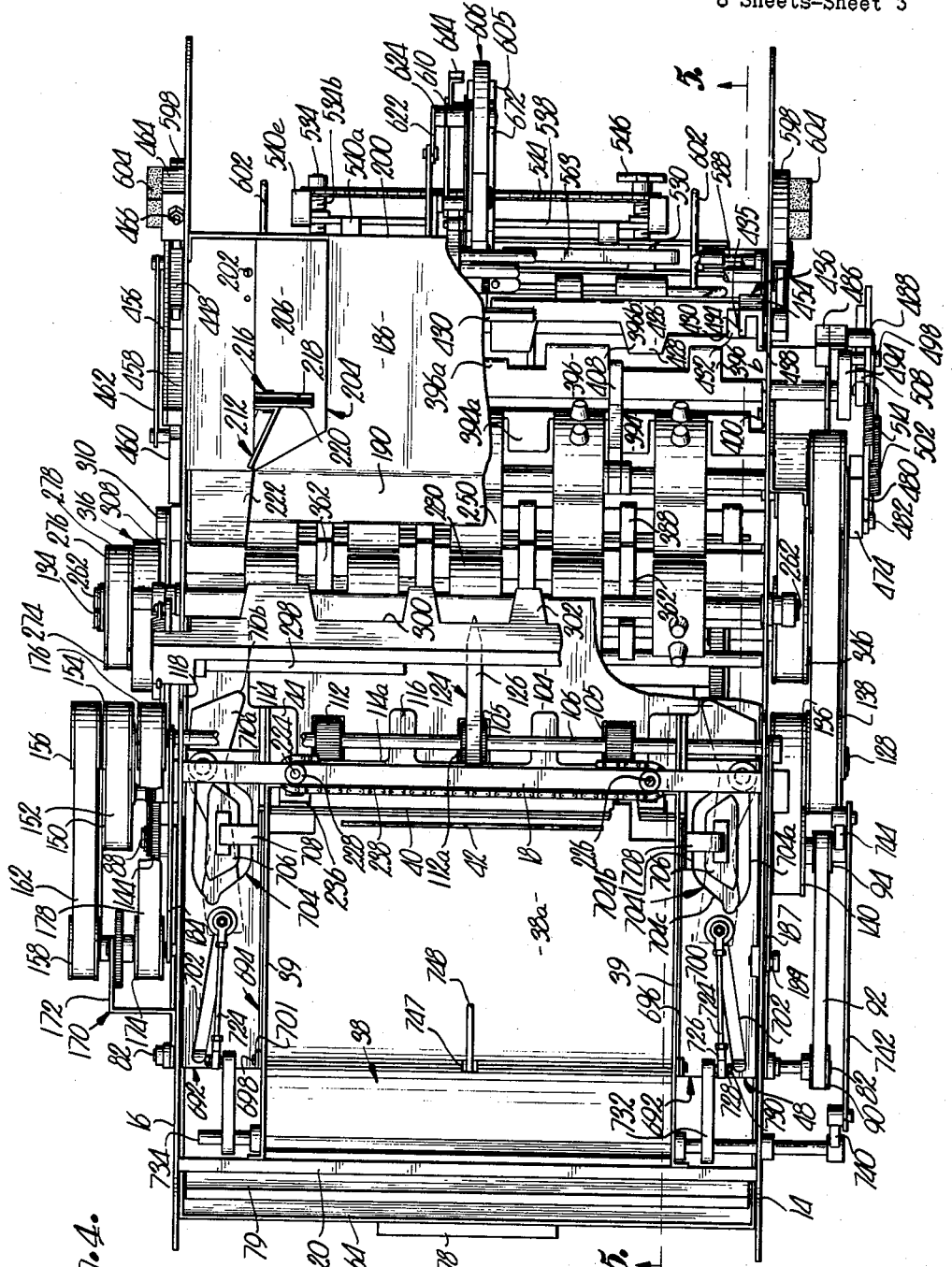

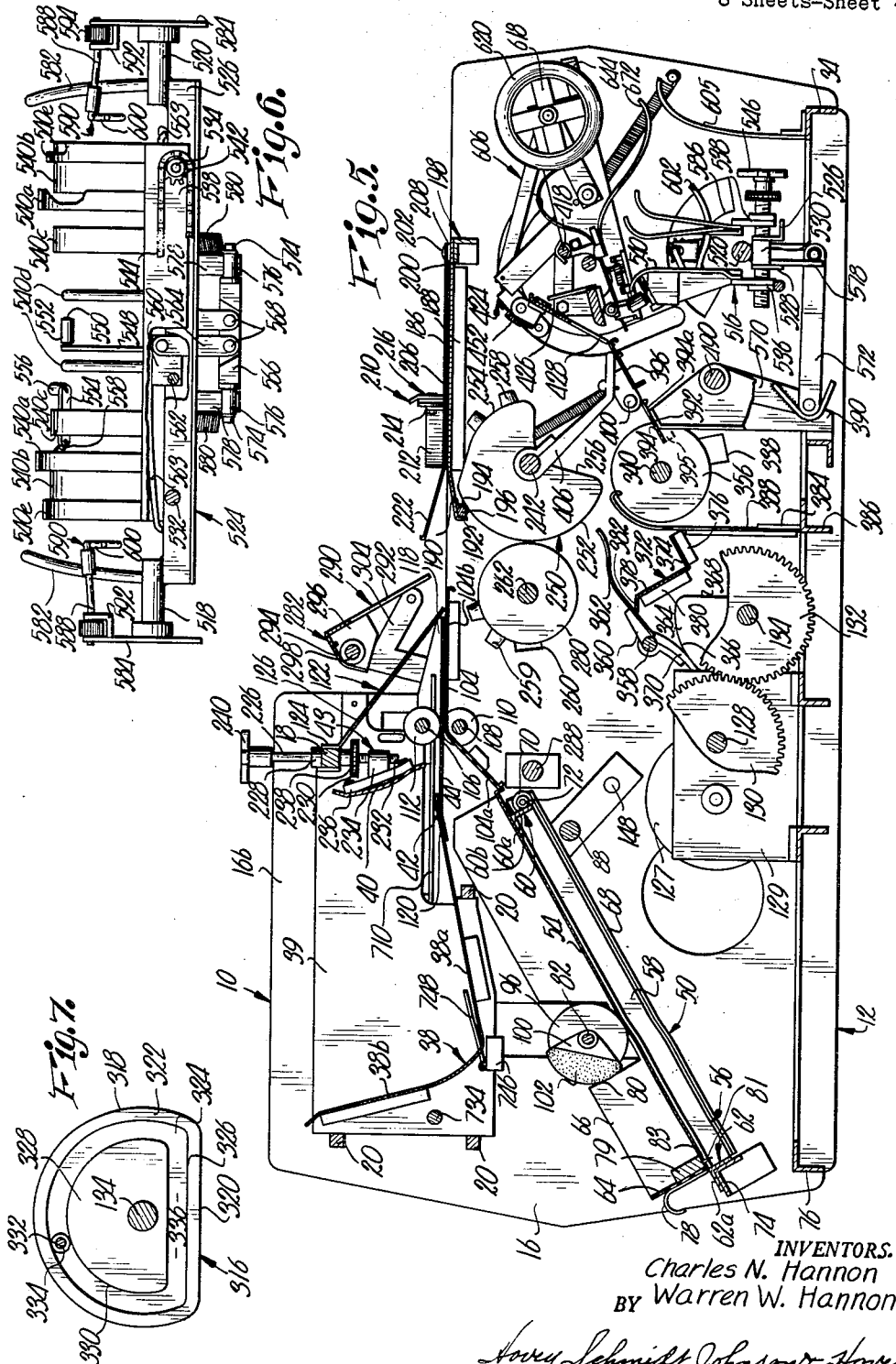

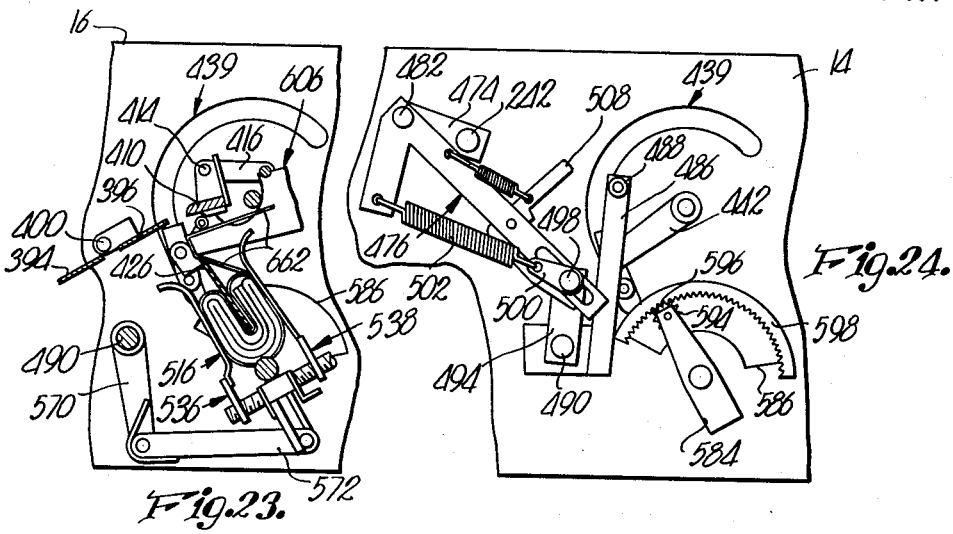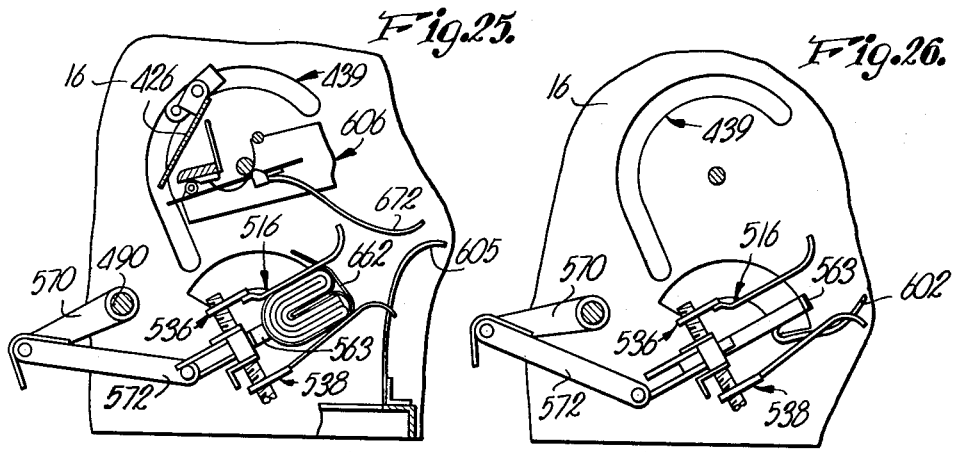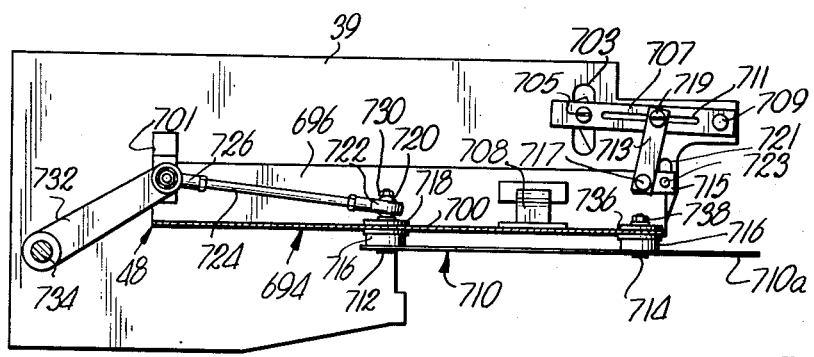

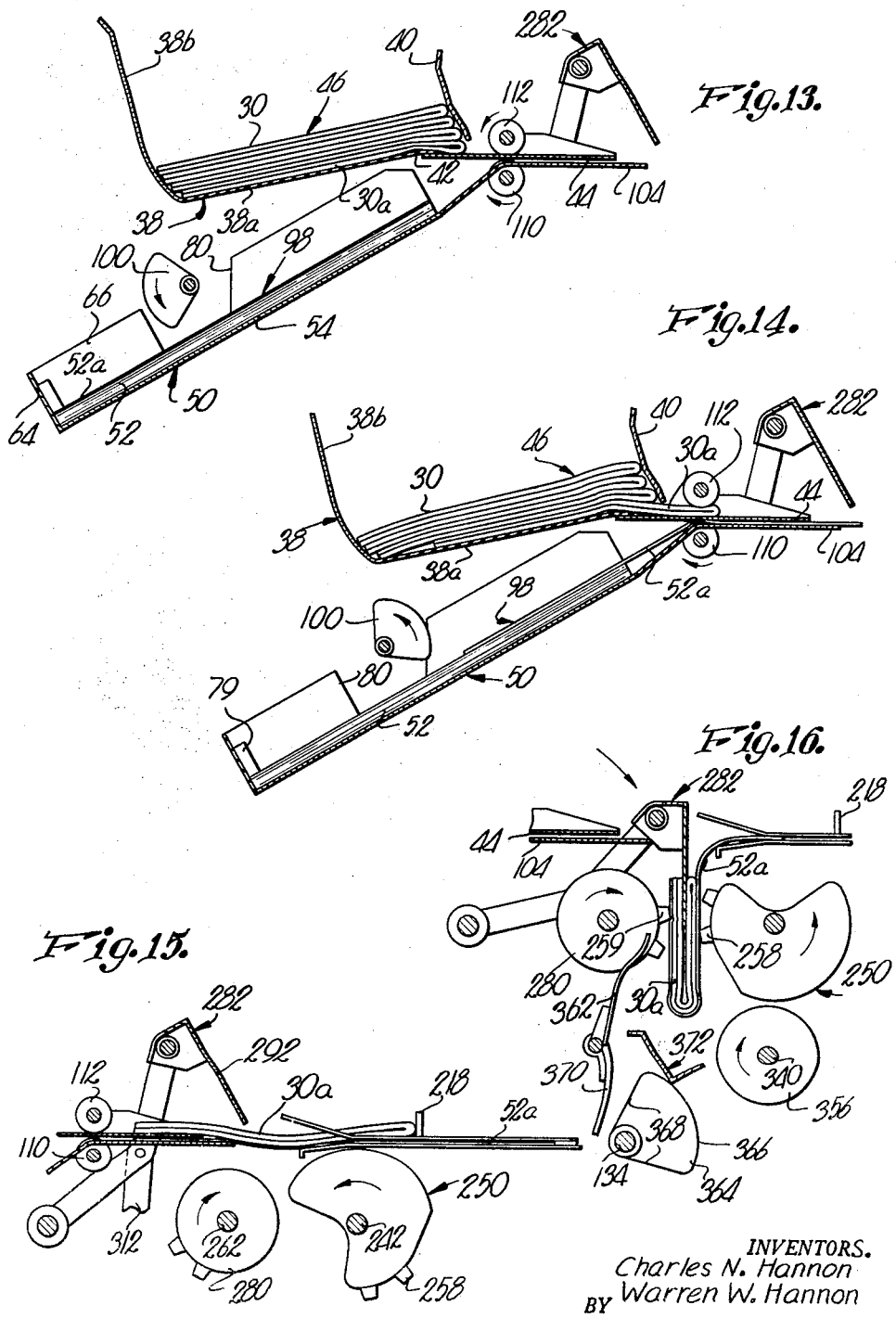

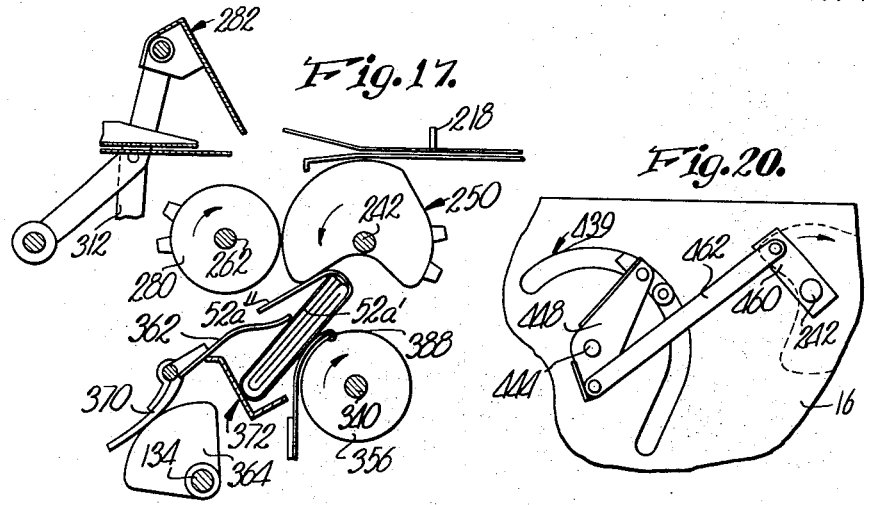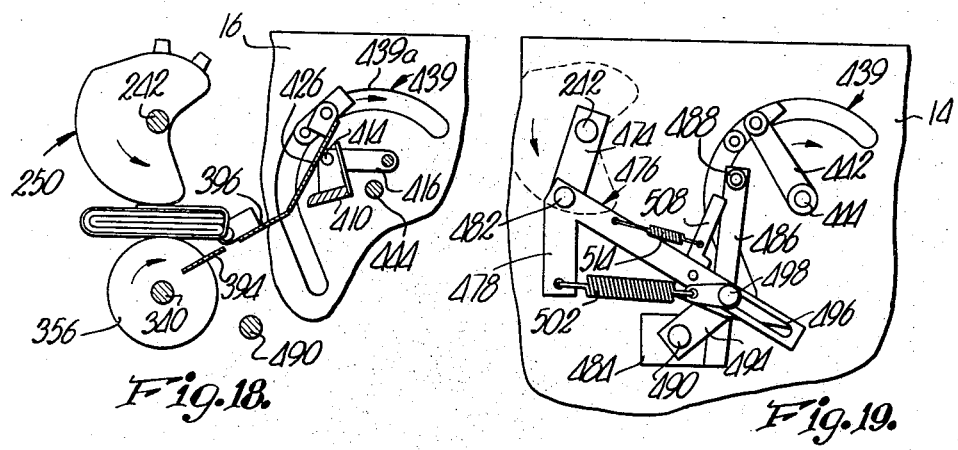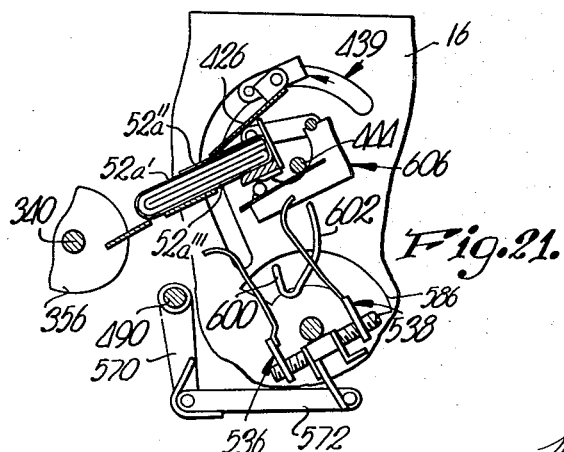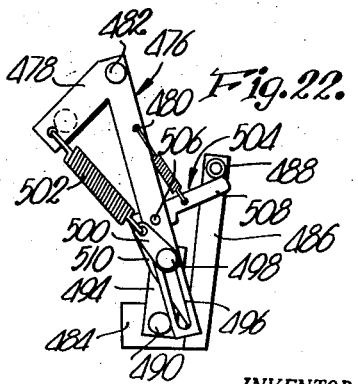

Aug. 25, 1964 C. N. HANNON ETAL 3,145,516
APPARATUS FOR THE PACKAGING OF NEWSPAPERS OR THE LIKE
Filed March 6, 1961 8 Sheets-Sheet 8
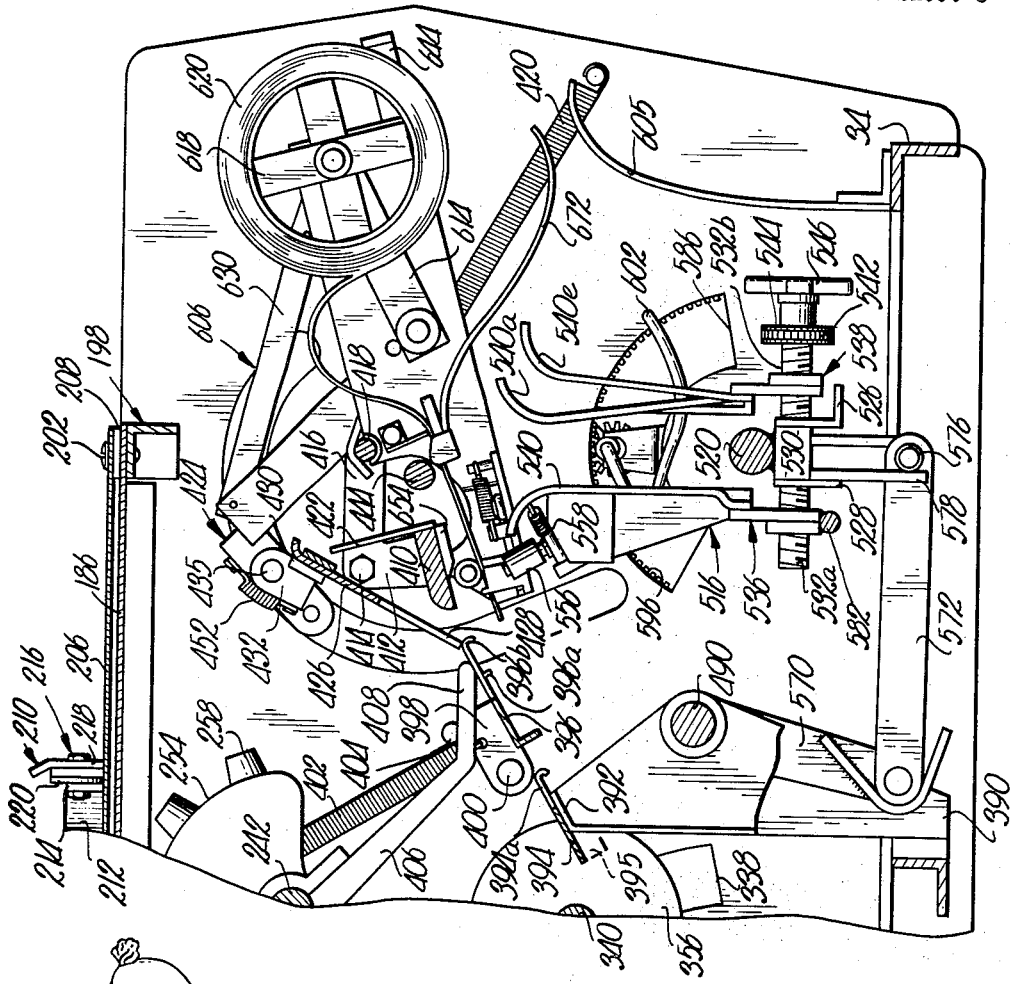
INVENTORS.
Charles N. Hannon
BY Warren W. Hannon
ATTORNEYS.

United States Patent Office 3,145,516
Patented Aug. 25, 1964

3,145,516
APPARATUS FOR THE PACKAGING OF
NEWSPAPERS OR THE LIKE
Charles N. Hannon, Olathe, Kans., and Warren W. Hannon, 501 S. Chestnut, Olathe, Kans.; said Charles N. Hannon assignor to said Warren W. Hannon
Filed Mar. 6, 1961, Ser. No. 93,769
36 Claims. (Cl. 53—120)

This invention relates to apparatus for packaging individual newspapers in a form suitable for residential distribution by carriers either on foot or from a moving vehicle, as well as to an improved method of wrapping individual newspapers with a protective cover thereover so that the papers are protected against moisture, or scuffing when the packaged newspaper is thrown against a rough surface or the like.

Newspapers are delivered to residential customers by rolling the initially folded newspaper into cylindrical configuration followed by placement of a securing member therearound in the nature of a string or an equivalent device. The papers are then distributed, either by a carrier on foot who throws the paper toward the residence from the sidewalk, or by a person on a moving vehicle who tosses the papers toward each house while the vehicle continues to move along the street. In order to permit throwing of the newspaper with reasonable accuracy, to assure that the same will travel over a relatively long path of travel, and to preclude the newspaper becoming unfolded in front of each house because of the wind or the like, it is the usual practice to fold the newspaper in some manner and secure the same in the folded condition so that the paper has a relatively high weight in relation to its volume to increase the distance which the folded newspaper may be thrown and to permit the same to be tossed into a designated area while the carrier vehicle continues to move or the deliveryman walks along in front of the house.

Carrier vehicles have replaced delivery boys on foot in many areas because of the relatively large distances which must be covered and also the rising labor costs which require mechanization of the process to a large extent in order to maintain the delivery cost at a minimum. Use of vehicles to deliver papers has resulted in a number of persons being required on each vehicle in order to roll the folded newspapers into cylindrical configuration and tie the same at the same time that papers are being thrown from the truck as the same moves along each street. Thus, although the delivery operation is materially speeded up by the use of vehicles, a relatively large number of delivery personnel must still be employed in order to wrap the papers as fast as the same are thrown from the vehicle. It has been impractical in most instances to fold or roll the papers prior to commencement of the delivery operation, inasmuch as the rolled newspapers take up considerably more space than the once-folded papers occupy in stacks and as received from the publishers. Furthermore, it is generally impractical to expect the person who is throwing the papers to also have time to wrap the same, this being especially true in inclement weather when it is necessary to place a protective cover such as a wax impregnated wrapper, around the papers so that the same will not become water soaked prior to being picked up by the customer.

It is therefore the primary object of the present invention to provide apparatus for automatically packaging newspapers in a form for delivery from a moving vehicle or the like and with a protective covering around the paper to either preclude the newspaper from being soaked during inclement weather, or to guard against scuffing of the outer sheet of the paper when the same strikes a rough surface when thrown into the front yard or driveway of each subscriber. In this respect, it is a further important object of the invention to provide an improved method of packaging newspapers which is completely automatic except for placement of the newspapers to be wrapped, and the protective wrappers therefor, in predetermined areas in the packaging apparatus.

Another very important object of the invention is to provide apparatus for packaging newspapers which is adapted to wrap the individual papers in any one of a large variety of protective wrappers whether of the waterproof or nonwaterproof type as well as of different sizes.

The present apparatus is designed to fold the individual newspapers in half transversely thereof a plurality of times to present a compact package which may be thrown with accuracy from a moving vehicle. Folding of the newspaper in the manner indicated produces a central trough therein extending longitudinally of the folded paper and presenting a very difficult area to protect from moisture because of the tendency of the water to run down into the individual troughs even when a wrapper is placed over the paper. It is a particularly important object of the invention to provide apparatus for folding a newspaper in half a number of times and in conjunction with a protective wrapper, and with the apparatus being constructed to fold opposed ends of the wrapper over one another and against the normally innermost face of the newspaper during folding thereof to thereby present a double protective layer over the trough section of the folded paper.

A further important object of the present invention is to provide apparatus for packaging newspapers wherein is included means for receiving a stack of newspapers as well as a stack of protective wrappers therefor, and including structure engageable with one of the newspapers and one of the wrappers in respective stacks thereof for shifting the same into superimposed relationship and then folding the newspaper and the wrapper transversely thereof a plurality of times to present a package with the outermost face of the folded newspaper protected by the protective wrapper. In this respect, an additional important object of the invention is to provide means forming a part of the apparatus for applying a securing member to the outer face of the wrapper to thereby maintain the newspaper in the folded condition thereof when the same is thrown from a moving vehicle or the like.

An especially important object of the invention is to provide apparatus as described above wherein the protective wrapper is folded with the newspaper so that the inner folds of the paper are protected from moisture regardless of what portion of the packaged newspaper is facing upwardly when the same comes to rest after being thrown from the carrier truck.

Also an important object of the invention is to provide apparatus for packaging newspapers wherein protective wrappers of greater transverse width than the corresponding width of the newspapers are used so that the wrappers extend outwardly from opposed extremities of the folded newspaper and with novel mechanism being provided on the apparatus for twisting the outer ends of the wrappers to preclude entrance of water into the package through the ends of the wrappers.

A still further important aim of the invention is to provide apparatus for packaging newspapers which have an initial transverse fold therein and with the papers being folded transversely thereof in half a number of times in the same direction as the initial fold of the paper so that the paper is not creased across the folds, which would tend to tear the paper and particularly the outer pages thereof because of excessive stress being placed on the folds of the newspaper during packaging thereof in the present apparatus.

Another important aim of the instant invention is to provide apparatus for packaging newspapers wherein waterproof as well as relatively inexpensive wrappers may be folded with the newspaper and in protecting relationship thereto, so that advertising material may be placed on the wrapper if desired, thereby increasing the revenue available to the carrier at the same time that his cost of delivering the papers is materially reduced by virtue of elimination of man hours normally required in the folding of the newspapers into form for throwing from a moving vehicle.

An important object of the invention is to provide apparatus for packaging newspapers as referred to above wherein the components for folding the papers and for placing a protective wrapper thereon, are fully adjustable to permit newspapers of varying thickness to be folded and thus permitting very thick Sunday newspapers to be folded with the same equipment that is employed to fold very thin newspapers such as are oftentimes published on Saturday evenings.

A further important object of the present invention is to provide apparatus for packaging newspapers which are initially folded in half transversely thereof and with the apparatus including structure for moving one folded newspaper of a stack thereof into a first folding station and in conjunction with shifting of a protective wrapper for the newspaper into underlying relationship to the newspaper while the latter is at the first folding station, and wherein is included novel mechanism for first folding the newspaper and the wrapper underlying the same, transversely thereof in half and with the wrapper disposed on the normally outer face of the newspaper, followed by folding of the newspaper again transversely thereof and in half and with the wrapper still positioned over the outer surface of the newspaper in protecting relationship thereto and finally, including components for applying a securing member to the folded newspaper to maintain the latter in the folded condition thereof even when the same is thrown from a moving vehicle.

It is also to be noted that a very important object of the invention is to provide apparatus for packaging newspapers of the type described above wherein the apparatus is of a size to be mounted in a carrier vehicle, thereby permitting the papers to be wrapped while the deliveryman is driving along his route and thereby reducing the number of personnel required to distribute the papers to a large number of subscribers.

Another important aim of the instant invention is to provide apparatus for packaging newspapers wherein the structure for removing one newspaper from a stack thereof as well as one wrapper from a stack of protective covers, and the mechanism for folding the newspapers and the wrappers therearound, are operable simultaneously and in cooperation so that a maximum number of newspapers may be packaged by the machine during operation thereof by virtue of the fact that the folding operation and removal of newspapers and wrappers from individual stacks thereof are carried out at the same time but in spaced relationship along the length of the packaging equipment.

A further important object of the instant invention is to provide a novel packaged newspaper wherein the same is folded in half transversely thereof a plurality of times and including a wrapper against one major face of the newspaper and overlying the outer surface thereof when in a folded condition to protect the face of the newspaper against scuffing and moisture, and wherein is included a securing member across the exposed extremity of the wrapper to maintain the newspaper in the fully folded condition thereof even when thrown from a moving carrier vehicle. An additional important object of the invention is to provide a packaged newspaper as defined wherein the wrapper is of greater transverse width than the width of the newspaper and with the outer portions of the wrapper being twisted in a manner to prevent water from entering the package through the ends of the wrapper.

An additional important object of the invention is to provide a relatively simple machine for folding newspapers in conjunction with a protective wrapper therefor and including structure for placing a securing member around the folded newspaper and wrapper, and with the components for effecting the folding operation being completely mechanical in nature so as to reduce the likelihood of failure of the machine during operation thereof, maintaining the preventive maintenance at a minimum, and of a design whereby the apparatus may be constructed at an economical figure notwithstanding the long useful life of the equipment.

Other important objects and details of construction of the present machine will become obvious or be described in detail as the following specification progresses.

In the drawings:

FIGURE 1 is a perspective view of apparatus for packaging newspapers embodying the preferred concepts of the present invention and shown in the completely assembled form thereof;

FIG. 4 is a top plan view of the packaging machine with the side covers removed and parts of the machine broken away and in section to reveal details of construction of the parts thereunder;

FIG. 5 is a vertical, cross-sectional view taken substantially on the irregular line 5—5 of FIG. 4 and looking in the direction of the arrows;

FIG. 6 is a front elevational view of the crusher and folded newspaper receiving bracket forming a part of the present apparatus and illustrating the same removed from the frame of the machine, and illustrating in detail the mechanism for twisting opposed ends of the wrapper over the newspaper as well as the arms for ejecting the folded paper from the packaging apparatus;

FIG. 7 is an enlarged, side elevational view of the inner face of a cam employed for operating the first tucker bar on the folding apparatus and effective to produce the first fold in each of the newspapers during the folding operation;

FIG. 8 is a side elevational view of the tape mechanism forming a part of the present apparatus and illustrating the same removed from the frame for the machine;

FIG. 9 is a fragmentary, top plan view of the tape mechanism illustrated in FIG. 8;

FIG. 10 is a bottom view of the cutter blade forming a part of the tape mechanism illustrated in FIG. 8;

FIG. 11 is a side elevational view of the cutter blade as shown in FIG. 10;

FIG. 12 is a fragmentary, side elevational view of the mechanism for removing one of the newspapers from the stack thereof and showing the structure for adjusting the disposition of the paper shifting fingers so that newspapers of different thicknesses may be folded with the present apparatus;

FIG. 13 is a diagrammatic representation of the portion of the present apparatus adapted to receive a plurality of newspapers in stacked relationship as well as a number of protective wrappers also disposed in an upright stack and with the mechanism for moving the wrappers as well as the lowermost newspaper of the stack also being shown schematically;

FIG. 14 is a diagrammatic view similar to FIG. 13 but illustrating movement of the lowermost newspaper as well as the uppermost wrapper of the stack thereof, toward the aligned disposition of the same preparatory to being folded in half transversely thereof through a tucker bar also illustrated schematically in the right-hand portion of the figure;

FIG. 15 is a schematic showing of the mechanism for forming the first fold in the aligned newspaper and the wrapper thereunder with the tucker bar being illustrated above the newspaper and the rollers for receiving the folded newspaper being shown immediately below the latter;

FIG. 16 is a schematic showing of the newspaper and wrapper after having been folded in half transversely thereof and disposed between the primary feed rollers while being directed toward an underlying supporting trough forming a part of the present apparatus;

Figure 2:
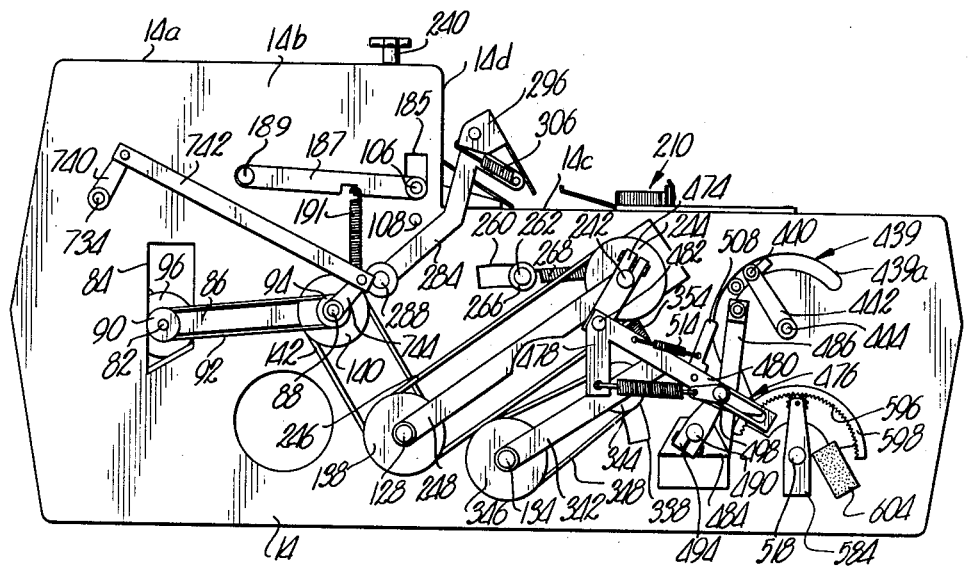
FIG. 2 is a side elevational view of the machine as illustrated in FIG. 1 and with the side cover thereof removed to illustrate the components thereunder.

FIG. 17 is a schematic showing of the paper after the same has moved down onto the trough below the upper feed rollers and illustrating the way in which the paper is displaced to the right by one of the upper feed rollers and moved toward a disposition to be received between the right-hand upper feed roller and a lower feed roller and in conjunction with guide means being forced into engagement with the outer surface of the protective wrapper to maintain the same in tight engagement with the outer surface of the folded newspaper;

FIG. 18 is a schematic showing of the folded newspaper as the same is moved to the right by the upper feed roller and the lower feed roller and onto a supporting plate in disposition where a second tucker bar may move into engagement with the central part of the folded newspaper to again fold the same in half transversely thereof;

FIG. 19 is a fragmentary, essentially schematic representation of lost motion mechanism employed to drive the crusher bracket which receives the newspaper and wrapper after the same have been folded the second time transversely thereof, and with the newspaper in the position thereof as shown in FIG. 18;

FIG. 20 is a fragmentary, generally schematic representation of the drive mechanism for shifting the second fold tucker blade as illustrated in FIG. 18;

FIG. 21 is a schematic showing of the mechanism for folding the newspaper in half a second time and illustrating the disposition of the tucker blade in the location thereof immediately prior to shifting of the tucker blade through an arc to effect folding of the newspaper and wrapper and forcing of the same downwardly into the crusher and folded newspaper receiving structure positioned immediately below the second tucker bar;

FIG. 22 is a fragmentary, generally schematic showing of the lost motion linkage as illustrated in FIG. 19 and showing the disposition of the same when the components are in the position thereof as shown in FIG. 21;

FIG. 23 is a fragmentary, schematic showing of the crusher and folded newspaper receiving structure illustrating the position of the same when the newspaper is forced thereinto and indicating the way in which a length of tape is applied to the outer face of the wrapper adjacent the upper margin of the folded newspaper;

FIG. 24 is a fragmentary, schematic showing of the lost motion mechanism and the outer part of the structure for twisting opposed ends of the wrapper around the newspaper, with the disposition of the elements being illustrated in the location thereof when the newspaper is in the position as illustrated in FIG. 23;

FIG. 25 is a fragmentary, generally schematic showing of the folded newspaper receiving and crushing structure as shown in FIG. 23, and showing the location of the same when the structure has been rotated into a position for ejection of the packaged newspaper;

FIG. 26 is a fragmentary, schematic view similar to FIG. 25 and showing the folded newspaper ejection arms in the outer position thereof after the folded newspaper, as shown in FIG. 25, has been ejected from the newspaper receiving and crushing bracket;

FIG. 27 is a fragmentary, enlarged sectional view taken on the line 5—5 of FIG. 4;

FIG. 28 is a fragmentary schematic view of the normally inwardly facing side of the lost motion mechanism as illustrated in FIG. 19; and FIG. 29 is a perspective view of a package wrapped with the present apparatus.

Apparatus embodying the preferred concepts of the present invention is designated generally by the numeral 10 in the drawings and includes a main, normally rectangular frame 12 serving as partial means for supporting a pair of upright wall plates 14 and 16, also interconnected in part by a main cross member 18 and a number of secondary cross members 20 and serving as means for mounting the newspaper and wrapper advancing mechanism as well as the folding structure, as will be explained hereinafter.

A pair of removable side panels 22 and 24 are carried by upright wall plates 14 and 16 while an upper wall member 26 is carried by the upper margins 14a and 16a of wall plates 14 and 16 in overlying relationship thereto and having a central rectangular opening 28 therein of a size to clear newspapers 30 which are in an initially folded condition transversely thereof, as illustrated in FIG. 13. The rear face of apparatus 10 is substantially open, while the space between protector covers 32 (FIG. 1) and the cross member 34 of frame 12, is open to permit folded newspapers to be ejected therefrom. A cover plate 36 is positioned in overlying relationship to the central part of apparatus 10 between side panels 22 and 24 and extending rearwardly from the corresponding ends of protector covers 32.

A panel 38 (FIG. 4) of generally upwardly facing L-shaped configuration and provided with a horizontal portion 38a as well as an S-shaped rear, upwardly extending portion 38b, extends between and is connected to a pair of upright, polygonal panels 39 having an irregular peripheral configuration, as best shown in FIG. 5, and are secured to the cross members 20 which extend between and interconnect the upper rectangular segments 14b and 16b of wall plates 14 and 16. The panel 38 thereby presents an open-top hopper for receiving a plurality of initially transversely folded newspapers 30, as shown in FIG. 13. It is to be noted that papers 30 are placed in the hopper defined by panel 38 with the folded portions thereof facing toward and in proximal relationship to a transversely curved guide plate 40 which extends between portions 14b and 16b of wall plates 14 and 16. Mechanism broadly designated 43 and carried by segments 14b and 16b of wall plates 14 and 16, serves as means for mounting guide plate 40 and permits vertical adjustment thereof, as will be detailed hereinafter. An elongated wire 42 extends across horizontal portion 38a of panel 38 between wall plates 14 and 16 in proximity to guide 40 for forming a slight ledge to force the lowermost newspaper 30a of the stack thereof to spread readily at the folded extremity thereof, for reasons to be made apparent hereinafter. A horizontal support plate 44 carried between wall plates 14 and 16 in alignment with the upper margins 14c and 16c and extending forwardly from the upright margins 14d and 16d of upper segments 14b and 16b of wall plates 14 and 16, serves as means for receiving the lowermost newspaper 30a when the latter is displaced from the stack 46 by paper advancement structure broadly designated 48 (FIGS. 4 and 12).

A hopper generally designed 50 is provided below panel 38 for receiving a stack of wrappers 52 with the hopper 50 comprising an inclined plate 54 secured to a supporting frame 56 including a pair of inclined angle members 58 parallel with wall plates 14 and 16, as well as a pair of angle members 60 and 62 which are in perpendicular relationship to angle members 58. The legs 60a and 62a of cross angle members 60 and 62 respectively extend toward the rear of apparatus 10 with leg 62a projecting outwardly from an upright rear wall member 64 secured to plate 54 and forming the rear extremity of hopper 50. Side panels 66 which extend upwardly in perpendicular relationship to inclined plate 54 cooperate with rear wall member 64 to maintain a plurality of wrappers 52 in stacked relationship as shown in FIG. 13. A pair of inwardly facing channels 68 are secured to the inner faces of wall plates 14 and 16 in parallel relationship with inclined plate 54 and serve as means for receiving a pair of rollers 70 which are rotatably mounted on cylindrical elements 72 welded to the outer face of leg 60b of cross angle member 60 adjacent the extremities thereof proximal to corresponding angle members 58. The angle member 62 is normally disposed on and in complemental relationship to a cross angle 74 extending between wall plates 14 and 16 adjacent the cross member 76 of frame 12. A J-shaped handle 78 secured to the outer face of rear wall member 64 permits the operator of apparatus 10 to readily remove hopper 50 from a position between wall plates 14 and 16 by grasping handle 78 and lifting hopper 50 upwardly until angle member 62 clears angle 74 whereby the rollers 70 may roll downwardly along the tracks presented by opposed channels 68.

An elongated, horizontal weight 79 having a plurality of downwardly extending, pointed elements 81 on the lower face thereof, is positioned within hopper 50 adjacent the inwardly facing surface of rear wall 64 for sliding movement therealong. It is to be preferred that the inclined plate 54 be provided with a series of openings 83 therein for clearing the elements 81 on weight 79. Stop members in the nature of screws may be threaded into the normally lowermost face of the weight 79 to serve as adjustable stops for limiting the extent to which the elements 81 pierce the stack of wrappers 52. If desired, channels may be provided on side panels 66 for restricting weight 79 to a rectilinear path of travel parallel with rear wall 64.

Figure 3:
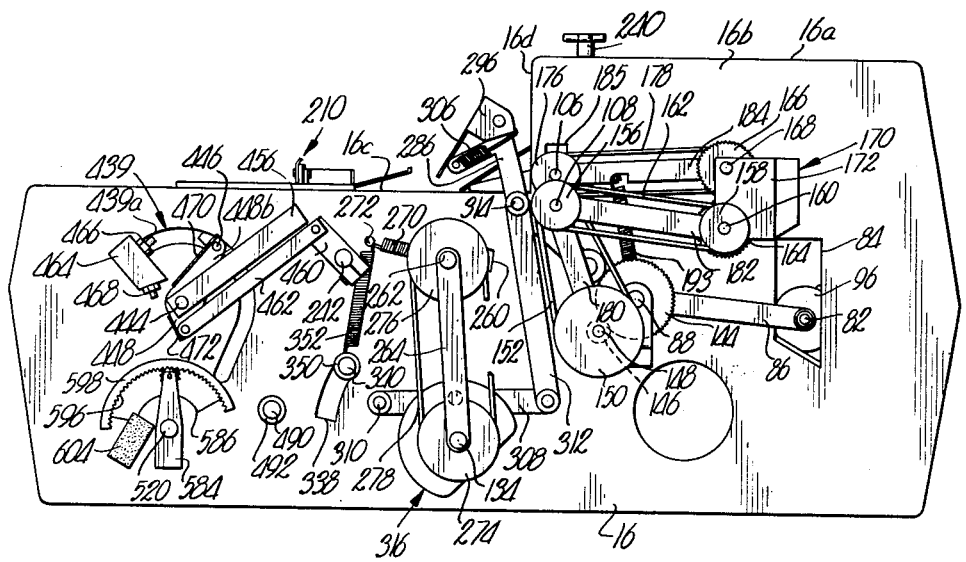
FIG. 3 is a side elevational view of the opposite side of the machine from that shown in FIG. 2, with the side cover also being removed to show the mechanical components mounted on the exposed side of the frame of the mechanism.

The side panels 66 have upwardly facing notches 80 therein for clearing a horizontal shaft 82, it being noted from FIGS. 2 and 3 that wall plates 14 and 16 are provided with upright, trapezoidal openings 84 therein in alignment with notches 80 and also adapted to clear the shaft 82. Means for mounting shaft 82 for reciprocable movement in openings 84 and notches 80 includes a pair of elongated bars 86 which are pivotally mounted on opposite extremities of a horizontal shaft 88 which extends between and projects outwardly from the opposed outer faces of wall plates 14 and 16. Shaft 82 is rotatable with respect to bars 86 and has a pulley 90 on the extremity thereof adjacent wall plate 14 for receiving an endless belt 92 which is also trained over a pulley 94 secured to shaft 88 for rotation therewith. Inasmuch as the bars 86 disposed outwardly of corresponding wall plates 14 and 16, are swingable with respect to shaft 88, it can be appreciated that shaft 82 is free to swing in a vertical arc independently of rotation of shafts 82 and 88.

A pair of discs 96 are mounted on shaft 82 in horizontally spaced relationship and freely rotatable thereon for providing a weight on the upper surface of the stack 98 of wrappers 52. In order to effect removal of one wrapper 52 at a time from the stack 98 thereof, each of a pair of members 100 of peripheral configuration conforming to a segment of a circle has a friction device 102 on the outer periphery thereof disposed to engage the upper sheet 52a of the stack 98. It is to be understood that devices 102 are secured to shaft 82 for rotation thereby. A generally L-shaped guide plate 104 for the wrappers 52 extends between wall plates 14 and 16 and includes a downwardly turned portion 104a which has a terminal end disposed to normally align with the upper transverse extremity of inclined plate 54 of hopper 50. The horizontal section 104b of plate 104 is in generally parallel relationship to support plate 44 and is spaced therefrom a distance sufficient only to clear one of the wrappers 52.

As indicated in FIGS. 4 and 5, a pair of parallel, horizontal shafts 106 and 108 also span the distance between wall plates 14 and 16 and project outwardly therefrom on opposite sides of support plate 44 and guide plate 104. The guide plate 104 has three openings 105 therein in direct alignment with panel 38 for clearing respective rollers 110 mounted on shaft 108 for rotation therewith and extending upwardly through corresponding openings in guide plate 104.

The shaft 106 carries three rollers 112 of the same diameter as rollers 110 and in direct opposition thereto, it being noted that support plate 44 has a front margin 114 of irregular transverse configuration (FIG. 4) and presenting a relatively wide notch 114a which clears the rollers 112 while the fingers 116 integral with margin 114 and projecting into notch 114a, are located on opposite sides of the central roller 112a and equidistant between the rollers 112 on opposite sides of central roller 112a. The upturned, generally trapezoidal flanges 118 integral with the side edges of support plate 44 are secured to the inner faces of upright wall plates 14 and 16 while an integral, inclined rear segment 120 of support plate 44 is secured to the underface of horizontal portion 38a of panel 38. A generally L-shaped finger 122 is disposed centrally between upright wall plates 14 and 16 and has a vertical leg 124 secured to cross member 18 and an inclined, elongated main portion 126 which extends downwardly into proximal relationship to the upper face of guide plate 104 adjacent the forwardmost margin of the latter.

Power means for driving shafts 106 and 108 includes an electric motor 127 mounted between upright wall plates 14 and 16 below shafts 106 and 108 and operably coupled to an output shaft 128 through suitable clutch and gear box structure 129. A pinion 130, mounted on shaft 128 for rotation thereby is in operable meshing relationship to a pinion 132 which is mounted on a main shaft 134 which spans the distance between upright wall plates 14 and 16 and projects outwardly from opposed faces thereof. As indicated in FIG. 2, the shaft 128 also projects outwardly through wall plate 14 and mounts a pulley 138 on the extremity thereof extending outwardly from the adjacent face of upright wall plate 14. The pulley 138 is operably coupled to a pulley 140 secured to the outer extremity of shaft 88 by an endless belt 142 so that power shaft 128 effects rotations of shaft 82 through pulleys 140 and 94 on shaft 88.

Viewing FIG. 3, it can be seen that the shaft 88 carries a pinion 144 on the extremity thereof projecting outwardly from wall plate 16 and which meshes with a pinion 146 carried by a stub shaft 148 mounted on and projecting outwardly from upright wall plate 16 immediately below shaft 88. Pulley 150 secured to shaft 148 outwardly of pinion 146 is coupled to shaft 108 through an endless belt 152 which is in turn trained over pulley 154 (FIG. 4) on shaft 108. The pulley 156 on the outer extremity of shaft 108 is joined to a pulley 158 carried by shaft 160 through an endless belt 162. Pinion 164 on shaft 160 meshes with a pinion 166 on shaft 168 above shaft 160, it being pointed out that shaft 168 is also mounted on the outer face of upright wall plate 16 and extends outwardly therefrom. Generally Z-shaped bracket 170 secured to upright wall plate 16 has an outer vertical leg 172 which supports the outer extremities of shafts 160 and 168 respectively. Pulley 174 carried by shaft 168 between pinion 166 and wall plate 16 is operably coupled to a pulley 176 on shaft 106, by endless belt 178. An elongated spacer bar 180 is provided between shafts 148 and 108 while another spacer bar 182 is located between shafts 160 and 108 and a third spacer bar 184 is provided between shafts 168 and 106.

The upper segments 14b and 16b of plates 14 and 16 are provided with opposed, rectangular openings 185 of equal size and located in proximity to the forwardmost edge of respective segments 14b and 16b for clearing shaft 106 to permit the latter to swing through a vertical arc. It is to be noted that elongated bar 187 of a length equal to bar 184 is swingably mounted on a stub shaft 189 coaxial with shaft 168 and projecting outwardly from the upper segment 14b of plate 14. The shaft 106 is pivotally received by the extremity of bar 187 remote from shaft 189 so that shaft 106 and the rollers 112 thereon may swing through an arc about the axes of shafts 168 and 189. Spring 191 coupled to bar 187 intermediate the ends thereof is secured to the outer face of plate 14 for biasing shaft 106 toward the lowermost end of its path of travel and with the rollers 112 engaging corresponding rollers 110 on shaft 108. A spring 193 is connected to bar 184 as well as to the outer face of upright plate 16 for cooperating with spring 191 to provide an even downward pull on shaft 106. It is preferred that the rollers 110 and 112 have a series of circumferentially disposed, longitudinally extended lands and grooves on the outer surface thereof to increase the frictional engagement of such rollers with newspapers 30 and wrappers 52, as will be made clearer hereinafter.

An additional wrapper and newspaper support plate 186 is provided between upright wall plates 14 and 16 and preferably disposed in forwardly spaced relationship from guide plate 104 although lying in a common plane with the latter. The plate 186 has a pair of opposed, parallel, downturned flanges 188 integral with opposite side margins thereof and lying in proximity to the inner faces of the forward sections of upright wall plates 14 and 16. The rearmost transversely extending marginal portion 190 of plate 186 is bent downwardly at a slight angle with respect to the horizontal, while the vertical terminal extremity 192 of marginal portion 190 cooperates with a number of clips 194 projecting downwardly from the undersurface of marginal portion 190 of plate 186 to releasably engage an elongated horizontal rod 196 extending between and connected to the inner faces of plates 14 and 16. Angle 198 extending between and secured to upright plates 14 and 16 in proximal relationship to the forwardmost edge of plate 186, is disposed in supporting relationship to the latter and has a generally horizontal leg 200 provided with a series of alignment openings therein (not shown) for receiving corresponding alignment elements 202 carried by plate 186 adjacent the side margins thereof. As best shown in FIG. 4, a pair of polygonal plates 204 are mounted on plate 186 in overlying relationship to the latter adjacent the side edges of the same and each provided with a downturned flange complemental with respective flanges 188 on plate 186 and secured to the latter by rivets or other suitable fastening means. The horizontal panel portion 206 of each of the plates 204 is disposed in spaced relationship to the upper face of plate 186 to accommodate one of the wrappers 52 thereunder. Relatively narrow strips 208 interposed between the forwardmost margins of each of the panel portions 206 of plates 204 and the upper surface of plate 186, serve as stops for limiting movement of each of the wrappers 52 toward the forwardmost extremity of apparatus 10.

Stops broadly designated 210 are also provided on each of the plates 204 and comprising a generally L-shaped bracket 212 having a vertical leg 214 extending transversely of apparatus 10 to serve as structure for receiving bolt and nut means 216 carrying a pair of spaced stop plates 218 and 220 which project away from corresponding brackets 212 toward the central area of apparatus 10 between upright plates 14 and 16. It is contemplated that the plates 220 in closest spaced relationship to rollers 110 and 112 be swingable about the axes of corresponding fastening means 216 to permit selective adjustment of the disposition of a newspaper 30 with respect to a wrapper 52 interposed between the upper face of plate 186 and the lower surfaces of panel portions 206 of plates 204. In order to facilitate entrance of a wrapper 52 into the space between plate 186 and the panel portions 206 overlying the same, each of the panel portions 206 of plates 204 is provided with rearwardly extending projections 222 which are inclined upwardly as the rear extremity of apparatus 10 is approached.

The mechanism 43 for varying the disposition of guide plate 40 with respect to panel 38 includes a pair of parallel, vertical shafts 224 and 226 which extend through and are rotatable in cross member 18, as shown in FIGS. 4 and 5. Collars 228 secured to each of the shafts 224 and 226 in overlying relationship limit downward movement of the latter with respect to cross member 18 while sprockets 230 are secured to each of the shafts 224 and 226 immediately below cross member 18 with tubular boss portions thereof in engagement with the underface of cross member 18 to preclude outward movement of the shafts. The lower extremities 232 of each of the shafts 224 and 226 are threaded and complementally received within internally threaded vertical bores provided in projections 234 secured to the forwardmost faces of mounting plates 236 in turn coupled to the guide plate 40, as shown in FIG. 5, to provide support for the latter. An endless chain 238 is trained over sprockets 230 while shaft 226 is considerably longer than shaft 224 and extends upwardly through the horizontal wall of member 26 to provide means for mounting an operating handle 240 which permits manual rotation of shaft 226 and thereby simultaneous rotation of shaft 224 through sprockets 230 and endless chain 238.

The main shaft 242 of the first fold mechanism extends across the space between upright plates 14 and 16 and projects outwardly therefrom on opposite sides of the same. A pulley 244 secured to shaft 242 in proximal relationship to the outer surface of upright plate 14, is operably coupled to pulley 138 on shaft 128 by endless belt 246, while an elongated spacer bar 248 is provided between shafts 128 and 242 to maintain the same in parallel relationship. Shaft 242 carries a series of folding and advancing cams broadly designated 250 with preferably five of such cams being mounted in equidistant relationship between the inner faces of upright plates 14 and 16. Each of the cams 250 is preferably constructed of somewhat resilient material such as hard rubber or a synthetic resin substance, and is provided with a semicylindrical main peripheral surface 252 of approximately 210° as well as a slightly S-shaped surface 254 of about 70° and spaced inwardly from the projection of semicylindrical surface 252. A concave surface 256 on each of the cams 250 and forming the remaining segment of the peripheral face of each of the cams 250 is of configuration to fold the wrapper 52 into the trough of a newspaper 30 being folded, as will be clearer hereinafter, and also clears the upper margin of the folded newspaper to direct the latter toward the next folding station of apparatus 10. A number of resilient elements 258 are secured to the surface 254 of each of the cams 250. The surface 252 of cams 250 clears bar 196 and the lower face of plate 186 during rotation of shaft 242, as is shown in FIG. 5.

Plates 14 and 16 are provided with a pair of opposed, identical, aligned, arcuate slots 260 which clear an elongated shaft 262 carried at the end thereof proximal to plate 16 by an elongated bar 264 pivotally mounted on the outer extremity of the shaft 134 therebelow, while the opposite extremity of shaft 262 is received within a bearing member 266 which is complementally received within the corresponding slot 260 for movement along the arcuate length thereof. A spring 268 couples shaft 262 to a point on upright plate 14 forwardly of the respective slot 260 while another spring 270 located outwardly of plate 16 and of equivalent size to spring 268, joins shaft 262 to plate 16 at pin 272 and also located forwardly of shaft 262 as shown in FIG. 3. It can be ascertained that the springs 268 and 270 place an equal force on shaft 262 and bias the latter toward the forward extremity of apparatus 10. A pulley 274 mounted on shaft 134 adjacent bar 264 is operably coupled to a pulley 276 on shaft 262 between bar 264 and plate 16, by an endless belt 278. The shaft 262 serves as means for mounting a series of rollers 280 which are preferably constructed of the same material that is used in forming cams 250, and as indicated in FIG. 4, a roller 280 is provided in direct opposition to each of the cams 250. If desired, flexible elements such as 259 may be provided on the outer peripheral surface of each of the rollers 280 but preferably positioned so as to interleave with the elements 258 on cams 250 during rotation of shafts 242 and 262.

Mechanism broadly denominated 692 is provided on opposite sides of the hopper defined by panel 38 for moving the lowermost newspaper 30a of the stack 46 thereof into disposition to be received between opposed rollers 110 and 112. Inasmuch as the mechanisms 692 are identical, only one of the same will be described in detail, with similar numbers being applied to identical parts.

An elongated L-shaped member 694 is provided between opposed panels 39 and upright plates 14 and 16, with the vertical side portions 696 being positioned in abutting relationship to respective panels 39. Structure is provided on panels 39 for permitting vertical adjustment of members 694 with respect to upright plates 14 and 16 as well as panels 39. As shown in FIG. 12, strips 701 secured to the outer surfaces of respective panels 39 receive corresponding side portions 696 therewithin. Fastening means 698 extending through respective panels 39, the strips 701 thereon and corresponding side portions 696 of members 694 permit the members 694 to swing through an arc about the parallel aligned axes of fastening means 698.

Panels 39 are provided with opposed, aligned, vertical slots 703 therein for clearing fastening means 705 which are threaded into or otherwise secured to corresponding mounting plates 236 and extend outwardly through aligned slots 703. Each of the fastening means 705 is pivotally connected to the outer extremity of an elongated arm 707 secured to each of the panels 39 on the normally outer faces thereof and swingable about respective pivot pins 709. Each of the arms 707 has a longitudinally extending slot 711 therein between fastening means 705 and opposed pivot pins 709. The connector links 713 associated with each of the arms 707 are pivotally mounted on a block 715 secured to the outer face of each of the side portions 696 of members 694. Pivot means 717 coupling each of the links 713 to corresponding blocks 715 permit members 694 to swing with respect to links 713, while fastening means 719 is provided on the upper extremity of each of the links 713 and extending through corresponding slots 711 in arms 707 for permitting selective adjustment of the disposition of each of the links 713 longitudinally of corresponding arms 707. Panels 39 are also provided with relatively short, upright, aligned slots 721 for clearing pins 723 which are mounted on blocks 715 and extend through respective openings 721.

The bottom wall 700 of each member 694 is disposed in a horizontal position, with the bottom walls preferably lying in a common plane. Each of the bottom walls 700 is provided with an elongated slot 702 therein disposed at an angle with respect to the longitudinal length of a corresponding member 694 and located adjacent the lowermost extremity thereof in proximal relationship to cross members 20, as is illustrated in FIG. 4. Bottom walls 700 also have an opening 704 therein of generally irregular peripheral configuration and provided with opposed rectilinear, substantially parallel margins 704a and 704b which are interconnected by end margins 704c of generally V-shaped configuration with the apex of the V in closer relationship to the margins 704a than corresponding opposed margins 704b. Island plates 706 are positioned centrally within each of the openings 704 and maintained in coplanar relationship to the bottom walls 700 of corresponding members 694, by generally L-shaped brackets 708 which are secured to the inner faces of respective side portions 696. It is to be noted that the peripheral margin of each of the island plates 706 is spaced from but substantially conforms to the margins of bottom walls 700 defining respective openings 704.

Elongated pusher plates 710 are located in underlying relationship to each of the bottom walls 700 and include rear, paper engaging segments 710a of generally trapezoidal configuration and thereby having an inner terminal extremity 710b of configuration to knife between opposed overlapped layers of paper 30a and thereby engage the zone of merger of such overlapped layers of the lowermost paper 30a to shift the latter toward rollers 110 and 112.

Pin means 712 and 714 secured to and extendind upwardly from each of the pusher plates 710 mount cylindrical spacers 716 which overlie corresponding pusher plates 710 and underlie corresponding bottom walls 700. The pins 712 extend upwardly through corresponding slots 702, are slidable therein and carry washer means 718 thereon in overlying relationship to respective bottom walls 700 of members 694. Balls 720 on the upper extremity of each of the pin means 712 pivotally receive respective ball joints 722 which are coupled to connecting rods 724 that extend toward the forwardmost margins of members 694. Another ball joint 726 on each of the connector rods 724 pivotally receives a corresponding ball 728 which is mounted through the medium of pins 730 on elongated crank arms 732 secured to and carried by an elongated shaft 734 which is rotatably carried by panels 39 and the upright plate 14, as is clearly shown in FIG. 4. The pins 714 extend upwardly through and are slidably received within the irregular slots presented by the outer surface of island plates 706 and opposed margins of bottom walls 700 presenting opening 704, with washer means 736 being mounted on pin means 714 in overlying relationship to respective island plates 706 and the bottom walls 700 of members 694. Fasteners 738 on the upper ends of pin means 712 and 714 secure pusher members 710 to members 694 for movement with respect to the latter.

Means for driving shaft 734 includes a crank arm 740 mounted on the extremity of shaft 734 projecting outwardly from upright plate 14 while an elongated link 742 is pivotally connected to the outer extremity of crank arm 740 as well as to a crank arm 744 secured to the proximal outer end of shaft 88 (FIG. 2).

First fold tucker mechanism broadly designated 282 is provided in overlying relationship to cams 250 and rollers 280 and includes a pair of generally L-shaped arms 284 and 286 which are pivotally mounted at the lower extremities thereof on the outer ends of a shaft 288 which extends between plates 14 and 16 and projects outwardly therefrom immediately below downturned portion 104a of guide plate 104. A tucker blade 290 pivotally mounted on the upper ends of arms 284 and 286 includes a main plate portion 292 which is of generally transverse L-shaped configuration and thereby provided with a rear leg segment 294 integral with the upper margin of main plate portion 292 as well as with opposed, polygonal end sections 296 which pivotally receive an elongated shaft 298 carried by the upper ends of arms 284 and 286 and extending through end sections 296 of tucker blade 290. As illustrated in FIG. 4, the forwardmost, downwardly projecting margin 300 of main plate portion 292 has a series of outwardly projecting, generally trapezoidal fingers 302 thereon which are integral with margin 300 and lie in the plane of plate portion 292. Extensions 304 secured to and projecting forwardly from arms 284 and 286 adjacent the upper extremities thereof serve as means for receiving coil springs 306 which are coupled to end sections 296 of tucker blade 290 for biasing main plate portion 292 of blade 290 toward extensions 304.

Structure for rocking tucker mechanism 282 about the axis of shaft 288 includes a generally horizontally disposed link 308 pivotally mounted on the outer face of upright wall plate 16 by a pivot pin 310 disposed forwardly of and above shaft 134. An elongated connector link 312 swingably couples the extremity of bar 308 remote from pivot pin 310, to arm 286 by a pivot pin 314 located intermediate the ends of arm 286 and preferably at the zone of juncture of the angularly disposed segments thereof. Cam member 316 secured to shaft 134 between link 308 and pulley 274 has a semicircular outer surface 318 of approximately 240° as well as a rectilinear surface 320 bisecting surface 318 and located in spaced relationship to the axis of shaft 134 as is best shown in FIG. 7. The outer rim 322 of cam member 316 and projecting away from the main wall 324 toward upright plate 16, has an inner surface 326 which conforms to the peripheral configuration of wall 324. An inner cam segment 328 integral with wall 324 and projecting away from the latter in the same direction as rim 322, also has a peripheral surface 330 which is spaced from and is complemental to the surface 326 of rim 322. Pin 322 secured to the outer face of link 308 intermediate the ends thereof carries a rotatable follower 334 which is rotatably received within the groove 336 defined by opposed surfaces 326 and 330 as well as the inner face of wall 324.

Upright plates 14 and 16 have another set of opposed, aligned, longitudinally arcuate slots 338 therein below shaft 242 for clearing an elongated shaft 340 which is carried in part by an elongated bar 342 located externally of plate 14 in parallel relationship thereto and pivotally mounted on shaft 134 for rotation about the axis thereof. Pulley 344 secured to shaft 340 between bar 342 and plate 14, is operably coupled to pulley 346 on shaft 134 by endless belt 348. A bearing member 350 on the extremity of shaft 340 opposed to pulley 344 is operably received within the slot 338 in plate 16 to thereby limit movement of the corresponding end of shaft 340 to an arcuate path of travel defined by the respective slot 338. A coil spring 352 interconnecting shaft 340 adjacent bearing member 350, with pin 272, serves as means for biasing one end of shaft 340 toward the uppermost end of its path of travel, while a corresponding spring 354 couples the opposite extremity of shaft 340 to a point on plate 14 opposed to pin 272 to thereby assure an even upward pull on shaft 340. A series of rollers 356 are mounted on shaft 340 between plates 14 and 16 and rollers 356 are also preferably constructed of material equivalent to that used in producing cams 350 and rollers 280, and it is also pointed out that the number of rollers 356 is preferably equivalent to the number of cams 250 employed on shaft 242 with rollers 356 also being in direct opposition to corresponding cams 250.

Shaft 358 extending between the inner faces of plates 14 and 16 and located intermediate shafts 134 and 262 (FIG. 5) has a plurality of projections 360 thereon serving as means for mounting somewhat S-shaped, flexible presser fingers 362 which are disposed between rollers 280 and cams 250 as illustrated in FIG. 4. A cam 364 secured to shaft 134 for rotation therewith and located in proximal relationship to plate 16, has a semicircular cam surface 366 as well as angularly disposed cam surfaces 368. A cam arm 370 secured to shaft 358 in alignment with cam surfaces 366 and 368 on cam 364 is biased into engagement with cam 364 by suitable spring means coupling projection means 360 on shaft 358 to either or both of the wall plates 14 and 16.

A folded newspaper receiving trough broadly designated 372 is carried between plates 14 and 16 in underlying relationship to shafts 242 and 262, it being noted in FIG. 5 that trough 372 includes a forward, inclined segment 374 having flange means 376 thereon joined to respective inner faces of plates 14 and 16 while another leg segment 378 integral with segment 374, disposed at an angle with respect to the vertical and relative to segment 374, also has flange means 380 thereon for securing trough 372 to plates 14 and 16. An uppermost segment 382 integral with the upper margin of segment 378 is in a substantially horizontal position to assure direction of a folded newspaper into the V-shaped trough presented by segments 378 and 374.

A horizontal strip 384 secured to the angle 386 of frame 12 and extending between plates 14 and 16 serves as means for mounting a plurality of flexible, substantially J-shaped guide fingers 388 which are preferably aligned with corresponding presser fingers 362. It is to be noted that the upper arcuate sections of each of the fingers 388 curves toward the forwardmost extremity of apparatus 10 in generally complemental relationship to the peripheries of rollers 356 but in slightly spaced relationship rearwardly therefrom.

Upright brackets 390 secured to frame 12 on opposite sides of the central cam 350 forwardly of shafts 242 and 340 have inwardly projecting, integral, angularly disposed upper flange sections 392 which are in horizontal alignment with shaft 340. Sections 392 partially support an inclined plate 394 which has a number of integral, outwardly extending, parallel fingers 394a on the trailing edge thereof. Opposed, downwardly projecting flanges 395 are secured to opposed plates 14 and 16. A swingable platform 396 is provided between upright plates 14 and 16 adjacent inclined plate 394 with a pair of mounting plates 398 being secured to opposed ends of platform 396 and pivotally mounted on the inner faces of plates 14 and 16 by respective pivot pins 400. Springs 402 are secured to plates 398 and to the inner faces of corresponding plates 14 and 16 for biasing platform 396 in a counterclockwise direction about the axes of pins 400 while stops 404 projecting outwardly from the inner surfaces of plates 14 and 16 are disposed to be engaged by plates 398 and thereby prevent movement of platform 396 past a location where the same is in coplanar relationship with respect to plate 394. The platform 396 also has a series of fingers 396a and 396b integral with the trailing edge thereof.

Additional wrapper pressure means comprises a plurality of arms 406 having a dog-leg therein and pivotally mounted on shaft 242 intermediate cams 250. As indicated in FIG. 5, the lowermost end 408 of each of the arms 406 is normally disposed in proximal relationship to platform 396 with such arms being swingable as a folded newspaper is moved thereunder.

A second platform 410 is provided adjacent platform 396 and is carried by a pair of opposed cranks 412 pivotally mounted on opposed upright plates 14 and 16 by pivot means 414. The rearwardly extending legs 416 of cranks 412 support an elongated, horizontal bar 418 therebetween and are biased downwardly in a clockwise direction by coil springs 420 which are coupled to respective inner surfaces of upright plates 14 and 16. Upright end plates 422 secured to the margin of platform 410 remote from platform 396 serve as stops for limiting movement of the folded newspaper in a direction toward the ejection end of apparatus 10.

Second fold mechanism broadly designated 424 includes an elongated tucker blade 426 made up of a pair of sections each having a pair of fingers 428 thereon extending toward platform 396 and clearing corresponding opposed fingers 396a and 396b of platform 396, with an elongated strap 430 being employed to interconnect adjacent extremities of the sections defining blade 426. Generally U-shaped mounting lugs 432 secured to opposite ends of blade 426 are normally disposed upwardly and embrace corresponding legs 434 of generally J-shaped components 436, each of which has a relatively long outer leg 438 located in proximal relationship to corresponding upright plates 14 and 16. Pins 435 extending through the legs of lugs 432 and the short leg 434 of each of the components 436 serve to pivotally mount lugs 432 on components 436 for rotation about the aligned axes of pins 435. As best shown in FIGS. 2 and 3, upright plates 14 and 16 are provided with a pair of opposed, aligned, identical, substantially J-shaped slots 439 for clearing means for mounting blade 426 on plates 14 and 16 for movement along paths of travel defined by slots 439. Stub shaft 440 secured to the leg 438 of the J-shaped component 436 adjacent plate 14 and extending through a respective slot 439, is coupled to and carried by a link 442 located externally of upright plate 14 and pivotal about shaft 444 located below the arcuate portions 439a of such slots 439 in plates 14 and 16 extending therebetween and projecting outwardly therefrom. The long leg 438 of the opposed J-shaped component 436 is provided with a stub shaft 446 thereon which projects through the opposite slot 439 and is connected to a bracket 448 which is pivotally carried by the outer extremity of shaft 444.

Coil springs 452 secured to the legs of lugs 432 received in corresponding J-shaped components 436, and to the bight portions 454 of each component 436, serve to bias lugs 432 and thereby blade 426 in a clockwise direction viewing FIG. 5. It is to be noted that the U-shaped lugs 432 engage the lower margin of the legs 434 of respective components 436 to limit the extent of pivoting of blade 426 with respect to components 436. An elongated strap 456 (FIGS. 3 and 4) is secured to the outer face of plate 16 in an inclined position, through the medium of a mounting block 458 coupled to the outer surface of plate 16, the lowermost extremity of strap 456 pivotally receiving shaft 444 to serve as an outer support for the latter. A link 460 secured to the end of shaft 242 projecting outwardly from plate 16, is connected to the lower leg portion 448a of bracket 448 by a connector link 462 which is pivotally joined to leg portion 448a and link 460 respectively. A stop member 464 mounted on the outer face of plate 16 adjacent the terminal extremity of the arcuate portion 439a of the slot 439 in plate 16, has stop elements 466 and 468 respectively thereon adapted to be engaged by the corresponding outwardly extending flange 470 of leg portion 448b of bracket 448, and the flange 472 of leg portion 448a.

Another link 474 is secured to shaft 242 externally of plate 14 and is operably coupled to a generally J-shaped drive crank member 476 having a relatively short leg 478 and a longer leg 480. As indicated in FIG. 2, J-shaped member 476 is pivotally secured to the outer extremity of link 474 remote from shaft 242 by a connector pin 482 which extends through member 476 at the zone of juncture of legs 478 and 480. A bracket 484 mounted on the outer face of plate 14 in underlying relationship to leg 480 of member 476, has an upwardly extending main leg 486 serving as means for mounting an outwardly extending roller 488 rotatable about a generally horizontal axis.

An elongated shaft 490 extending between plates 14 and 16, rotatably carried in a bearing 492 on plate 16 and extending outwardly from bracket 484 on plate 14, carries a link 494 located externally of plate 14 and extends upwardly toward leg 480 of member 476. The leg 480 is provided with an elongated slot 496 in the lowermost extremity thereof which slidably receives a stub shaft 498 secured to the upper end of link 494. A rocker element 500 is connected to the outer end of shaft 498 and overlying leg 480 of member 476, and a coil spring 502 serves to connect the outer end of element 500 to the lower extremity of leg 478 of member 476.

A generally L-shaped release member 504 is pivotally secured intermediate the ends thereof to leg 480 of member 476 and in underlying relationship thereto, by a pivot pin 506 which is operably coupled to release member 504 intermediate the legs 508 and 510 thereof. As illustrated in FIG. 22, leg 508 of release member 504 is of sufficient length to engage roller 488 on leg 486 when member 476 is in the disposition thereof shown in this illustration. The leg 510 of release member 504 has an upwardly facing notch 512 therein disposed to engage the shaft 498 on link 494. Coil spring 514 interconnecting leg 508 of release member 504 and leg 480 of member 476 biases release member 504 in a counterclockwise direction as shown in FIG. 2.

Generally U-shaped, folded newspaper receiving and crushing means and broadly denominated 516 is provided between plates 14 and 16 in underlying relationship to second fold mechanism 424 and includes a pair of stub shafts 518 and 520 rotatably received in aligned coaxial bearings positioned on plates 14 and 16 beneath shaft 444, with opposed shafts 518 and 520 extending through corresponding plates 14 and 16. The inner extremities of stub shafts 518 and 520 are secured to and carry an elongated frame 524 made up of an angle 526 and a strap 528 which are interconnected by a plurality of connector blocks 530. A pair of threaded members 532 and 534 are rotatably carried by respective spaced blocks 530 between angle 526 and strap 528 and project outwardly therefrom in opposite directions. The outer portions 532a and 532b of member 532 as well as the portions 534a and 534b of member 534 are oppositely threaded and serve as means for supporting opposed, horizontal, upright plate units 536 and 538 located on opposite sides of shafts 518 and 520. Inasmuch as the threaded portions of members 532 and 534 are complementally threaded into units 536 and 538, it can be appreciated that upon rotation of members 532 and 534, units 536 and 538 are shifted toward and away from angle 526 and strap 528.

A number of generally J-shaped, flexible fingers 540 are secured to each of the units 536 and 538 and extending upwardly therefrom in disposition such that the arcuate outer extremities of each of the fingers 540 face away from the central area between such fingers. It is to be preferred that certain of the fingers such as 540a on unit 538 be bent inwardly at a slightly greater angle than the remaining fingers 540 on unit 538 to present a somewhat narrower space between the opposed fingers 540 on unit 536 and fingers 540a to effect a crushing action on the folded newspapers, as will be set forth hereinafter. The fingers 540b on unit 536 are relatively wide transversely thereof, as illustrated in FIG. 6, the fingers 540c are somewhat narrower, while the fingers 540d are formed of steel rod and therefore flex very little longitudinally thereof. It can also be ascertained from FIG. 6 that the outer fingers 540e on unit 538 are in greatest spaced relationship to the fingers 540 on unit 536 whereas fingers 540a are bent toward the fingers 540b.

The portions 532b and 534b of members 532 and 534 have sprockets 542 thereon which are in alignment longitudinally of newspaper receiving and crushing means 516 and are operably interconnected by an endless chain 544 trained thereover. A readily accessible operating handle 546 on the outer extremity of portion 532b permits manual rotation of members 532 and 534 to shift units 536 and 538 toward and away from each other.

An upright member 548 secured to the outer face of strap 528 located between fingers 540d and terminating adjacent the upper extremities thereof, mounts a horizontal pin 550 rotatably carrying a roller 552 disposed intermediate fingers 540d. A cross member 554 pivotally mounted on the outer face of the finger 540c proximal to shaft 518, carries a roller 556 on the extremity thereof adjacent member 548 and in a direction away from the fingers 540. Spring 558 is secured to the upper extremity of the finger 540b adjacent shaft 518.

A pair of blocks 560 are provided between angle 526 and strap 528 intermediate blocks 530 and are pivotal about corresponding pins 562 carried by angle 526 as well as strap 528 (FIG. 6). Elongated ejector arms 563 welded to the upper edges of corresponding blocks 560 and extending outwardly therefrom toward corresponding shafts 518 and 520 but terminating in spaced relationship thereto as shown in FIG. 6, serve to eject a folded newspaper from means 516 upon pivoting of blocks 560 about pins 562, as will be made clearer in the description of operation of apparatus 10. Links 564 pivotally secured to respective rectangular blocks 560 at the corners thereof in diagonal relationship to pivot pins 562, project downwardly below angle 526 and strap 528 and are secured to a generally horizontal member 566 through suitable pivot means 568. A pair of links 570 connected to and extending downwardly from shaft 490 between brackets 390 are operably joined to member 566 by respective parallel connector links 572 pivotally received by corresponding stub shafts 574 projecting outwardly from opposed ends of member 566. Rollers 576 rotatably mounted on shafts 574 outwardly of connector links 572 are disposed to engage opposed straps 578 secured to the inner face of strap 528. Coil springs 580 are coupled to the outer ends of shafts 574 as well as to suitable connector means between angle 526 and strap 528 for biasing member 566 into the disposition thereof shown in FIG. 6.

A pair of generally L-shaped rods 582 are mounted on opposite ends of unit 536 and have upper legs extending upwardly therefrom to assist in twisting the ends of each of the wrappers 52 around one of the folded newspapers 30. The structure for effecting twisting of opposed ends of each wrapper 52 includes a pair of arms 584 secured to the outer extremities of shafts 518 and 520 externally of plates 14 and 16 and extending upwardly therefrom. Plates 14 and 16 are provided with opposed, semicircular, aligned slots 586 in coaxial relationship with shafts 518 and 520 and adapted to clear the generally horizontal segments 588 of twister members broadly designated 590. As best illustrated in FIG. 6, L-shaped components 592 are carried by the inner surfaces of the upper extremities of each of the arms 584 with segments 588 of twisting members 590 extending through and rotatably received by the upper ends of arms 584 as well as the upright legs of components 592. Pinions 594 secured to segments 588 of members 590 between the upright legs of components 592 and arms 584, are disposed to operably mesh with the concave surface 596 of an arcuate rack 598 mounted on the outer face of each of the plates 14 and 16 in complemental overlying relationship to each of the slots 586.

The innermost, generally vertical segments of members 590 have a relatively short leg 600 integral with the inner extremities of respective segments 588 as well as substantially longer, somewhat S-shaped legs 602 which merge with the outer extremities of legs 600 to present a generally V-shaped area therebetween adapted to receive the outer end portions of each of the wrappers 52 around a corresponding newspaper 30. Blocks 604 on the outer faces of plates 14 and 16 adjacent the outer terminal ends of slots 586 as illustrated in FIGS. 2 and 3, serve to limit swinging movement of arms 584 toward the rear of apparatus 10.

An L-shaped bracket 601 secured to the upper face of the rearmost cross member 34 of frame 12 intermediate the ends of cross member 34, carries an upright, longitudinally arcuate presser finger 605 in direct alignment with presser finger 672 and terminating in relatively close relationship to the outer extremity of the upper finger 672.

Automatic taping mechanism broadly designated 606 is provided in overlying relationship to U-shaped folded newspaper and crushing means 516 and as best shown in FIGS. 5 and 8 to 11 inclusive, includes a main upright frame member 608 having a tubular boss 610 on the face thereof adjacent plate 16 for pivotally receiving a stub shaft 612 which carries a crank arm 614 secured to shaft 612 through a tubular boss 616 coupled directly to shaft 612. A reel pivotally mounted on the outer extremity of shaft 612 is formed of a pair of generally U-shaped components 618 in crossed relationship adapted to carry a roll 620 of tape having adhesive on the normally innermost surface thereof. A second crank arm 622 secured to shaft 612 in proximal relationship to boss 610 through means of a boss 624 integral with crank arm 622, is located at an angle with respect to crank arm 614 as is apparent from FIG. 8. A pusher member 626 pivotally mounted on a pin 628 projecting outwardly from frame member 608 in the same direction as crank arm 622, is swingably coupled to the outer extremity of arm 622 by a connector link 630.

Mechanism is provided for releasably securing tape mechanism 606 to bar 418 between plates 14 and 16 and includes a connector element 632 having a downwardly bent terminal portion 632a as well as a block 634 secured to the opposite extremity thereof carrying a pivot pin 636. A tubular component 638 mounted on element 632 intermediate the ends thereof rotatably receives a pin 640 mounted on the face of frame member 608 proximal to pusher member 626. A generally horizontal, semi-cylindrical support 642 is mounted on the upper margin 608a of frame member 608 and is adapted to complementally engage the underface of bar 418. A manually swingable, generally L-shaped lock member 644 pivotally mounted on frame member 608 by a pivot pin 646 is operably coupled to block 634 on element 632 by an elongated connector link 648 pivotally joined to pin 636 as well as to lock member 644 intermediate the ends thereof through the medium of a pivot pin 650. As indicated in FIG. 8, the terminal portion 632a of element 632 is located in direct overlying relationship to support 642 when lock member 644 has been swung upwardly slightly above the axis of pin 646 and with lock member 644 engaging suitable stop means in the nature of a pin or the like directly underlying shaft 612.

The normally forwardmost extremity of frame member 608 has a generally arcuate notch 652 therein with a normally horizontal element 654 being mounted on the uppermost margin 656 of the outer end 608b of frame member 608. The cross element 654 extends outwardly in opposite directions from the major plane of frame member 608 and is adapted to be disposed in abutting relationship to the underside of platform 410, as is evident from FIG. 5. Roller 658 pivotally mounted on pin 660 underlying and spaced slightly forwardly from element 654 is adapted to receive tape 662 of roll 620 thereunder. A platform 664 integral with and projecting outwardly from frame member 608 in the same direction as roller 658, serves as a support for the length of tape 662 and a check blade 666 is pivotally mounted on frame member 608 above platform 664 by pivot pin 668 disposed in a position permitting the lower edge of blade 666 to move into engagement with the upper face of platform 664 when the tape 662 is not positioned thereon. The outer extermity of arm 614 carries a roller 670 thereon in alignment with platform 664 and roller 658 with the length of tape 662 also passing over roller 670 as shown in FIG. 8. A generally S-shaped presser finger 672 is secured to the underface of platform 664 and projects rearwardly therefrom into underlying relationship with respect to the reel for tape roll 620 for smoothing the tape against the packaged newspaper.

Means for severing the tape 662 into predetermined lengths dependent upon the size of newspaper being packaged in apparatus 10, comprises knife structure broadly designated 674 and including a horizontal platform 676 integral with and projecting outwardly from the forward portion 608b of frame member 608 in underlying relationship to roller 658 as well as cross element 654. An upright block 678 integral with the forward marginal portion of platform 676 as well as extremity 608b of frame member 608, has a horizontal slot (not shown) for clearing an elongated cutter blade 680 slidable on the upper face of platform 676. Blade 680 has an integral, generally upwardly extending lug 682 thereon which is pivotally joined to an upright stud 684 on the rear margin of platform 676 through the medium of a coil spring 686. Mechanism for shifting blade 680 forwardly against the action of coil spring 686 includes an actuating bar 688 pivotal about an upright pin 690 on the upper face of platform 676 and extending through bar 688 intermediate the ends thereof. As shown in FIG. 9, the rear margin 680a of blade 680 is inclined at an angle with respect to the longitudinal side margins of blade 680 so that during swinging movement of bar 688, the cam surface 688a thereof rides against inclined edge 680a to force blade 680 through the slot therefor in block 678 and forwardly of margin 608b of member 608 to sever the tape 662.

Blade 680 has a forward, generally V-shaped, beveled edge 680b as well as an integral, generally oval configured projection 680c which is sharp on the forwardmost extremity thereof to effect piercing of the tape 662 immediately prior to severing thereof by the edge 680b. The outer end of bar 688 remote from platform 676 is disposed in a position to be engaged by the roller 556 on cross member 554 of U-shaped means 516.

A microswitch 746 is mounted beneath horizontal portion 38a of panel 38 and the latter is provided with an opening 747 therein for clearing an elongated switch arm 748 which extends along the upper face of panel 38 in generally parallel relationship thereto. Switch 746 senses when the hopper defined by panel 38 is empty of newspapers 30 to deactivate motor 127.

Operation

In the operation of apparatus 10 it is initially assumed that all of the components are in stand-by condition with cams 250 and rollers 280 initially in the disposition thereof illustrated in FIG. 15 and with folded newspaper and crushing means 516 being located immediately below second fold mechanism 424 as illustrated in FIG. 21. The pusher plates 710 are initially located in the disposition of the same illustrated in FIG. 4 and the first fold tucker mechanism 282 is at the upper end of its path of travel, as shown in FIG. 5. Newspapers 30 having an initial transverse fold therein are placed in the hopper presented by panel 38 in stacked relationship as shown in FIG. 13 and to present the stack 46 thereof.

The operator of apparatus 10 rotates handle 240 in a direction to raise or lower the guide plate 40, depending upon the thickness of each of the papers 30. For example, if it is necessary to lower guide plate 40 so that the lower margin thereof will clear only one of the newspapers 30 at a time, the operator rotates handle 240 in a manner to turn shaft 226 in a direction to force projections 234 on plates 236 downwardly whereby the mounting plates as well as guide plate 40 are also shifted toward the upper face of horizontal portion 38a of panel 38. The lower margin of guide plate 40 remains in horizontal disposition throughout the time that the guide plate is raised and lowered by virtue of the endless chain 238 trained over sprockets 228 on shafts 224 and 226 respectively. Thus, rotation of shaft 226 by operating handle 240, effects rotation of shaft 228 to the same extent.

The newspapers 30 carried by panel 38 depress the switch arm 748 of switch 746, thereby closing the circuit to motor 127 and permitting actuation of apparatus 10 through a manually controlled switch which is preferably mounted on one of the protector covers 32.

The hopper 50 is also filled with wrappers 52 of predetermined characteristics. For purposes of initial description of the operation of apparatus 10, it is assumed that wrappers 52 are of wax impregnated paper of predetermined length and width so as to permit effective covering of each of the newspapers 30 upon folding of the latter in apparatus 10. It is furthermore assumed that the wrappers 52 are of sufficiently wider transverse dimension to present opposed end portions thereof which extend outwardly from opposite ends of each of the newspapers 30 upon folding of the same.

The hopper 50 is most expeditiously filled by the operator grasping handle 78 and lifting hopper 50 upwardly sufficiently to cause the angle member 62 to clear cross angle 74 whereby the hopper 50 may be pulled out from between upright plates 14 and 16 as rollers 70 move along the longitudinal length of opposed channels 68. During such removal of hopper 50 from between plates 14 and 16, it is to be preferred that the shaft 82 be grasped by the operator and held upwardly away from the bottom plate 54 of hopper 50. A number of wrappers 52 are placed in hopper 50 between side panels 66 and supported by plate 54 as indicated in FIG. 13. The rearmost margins of the wrappers 52 engage the inner face of rear wall member 64 of hopper 50. The hopper 50 is then returned to the initial position of the same as shown in FIG. 5 with the angle member 62 complementally engaging cross angle 74 and thereby causing hopper 50 to be disposed at a predetermined angle with respect to the horizontal.

In this respect, it is to be pointed out that the angle of inclination of plate 54 of hopper 50 is important to proper operation of apparatus 10. By virtue of the fact that the upper margins of the wrappers 52, when the same are within hopper 50, are located in a common upright plane which is parallel with the major faces of rear wall member 64, it can be seen that the upper margins of such wrappers are thereby at an angle with respect to a vertical plane through the axes of rotation of shafts 106 and 108. The uppermost wrapper 52a of the stack 98 thereof is directed toward rollers 110 and 112 by frictional devices 102 and thus, the devices 102 force the same length of paper between rollers 110 and 112 during each cyclic operation of apparatus 10, regardless of the height of stack 98 of wrappers 52 in hopper 50. If the wrappers 52 in stack 98 thereof were disposed horizontally rather than at the predetermined angle illustrated in FIG. 5, it can be seen that variation in the height of the stack 98 would result in the wrappers 52 being delivered to rollers 110 and 112 through power strokes of differing lengths depending upon the disposition of hopper 50 with respect to rollers 110 and 112.

When the hopper 50 has been returned to the original location of the same, the weight 79 is placed in the location thereof illustrated in FIG. 5 whereby the same slidably engages the inner face of rear wall member 64 with the pointed elements 81 engaging and extending through the uppermost wrappers 52 of stack 98. The elements 81 pierce at least the uppermost wrapper 52a and in most instances, also pierce additional wrappers 52 below the uppermost wrapper which is removed from the stack 98 thereof by frictional devices 102.

A roll 620 of tape is placed on the reel defined by components 618 in a manner such that the adhesive surface of the tape 662 faces upwardly. The outer free end of the tape 662 is passed over roller 670 on crank arm 614, is then threaded under check blade 666 in overlying relationship to platform 664, then is pushed under roller 658 and finally is pulled downwardly in front of the end 608b of frame member 608.

Apparatus 10 is now in condition for automatic wrapping of newspapers to produce a final package 750 as illustrated in FIG. 29. The main operating switch on cover 32 is closed whereby motor 127 is energized to effect rotation of the output shaft thereof which causes shaft 128 to be rotated through the means of gear box 129 at a predetermined speed. Pinion 132 meshing with pinion 130 on shaft 128 is caused to rotate at the same speed as pinion 130 whereby shaft 134 is rotated in a clockwise direction viewing FIG. 5. Rotation of shaft 134 causes shaft 262 to be rotated therewith through pulley 274 on shaft 134 and the pulley 276 on shaft 262, which are interconnected by the endless belt 278. Rotation of shaft 262 causes the rollers 280 thereon to be rotated in a clockwise direction and simultaneously with rotation of cams 250 mounted on shaft 242. Cams 250 are rotated at a predetermined speed in a counterclockwise direction viewing FIG. 5, by shaft 128 through the pulley 244 on shaft 242, the pulley 138 on shaft 128, and the endless belt 246 interconnecting pulleys 138 and 244.

It is also to be understood that the rollers 110 and 112 are rotated simultaneously with rotation of cams 250 and rollers 280 in opposite directions, with the shaft 106 carrying rollers 112 being driven from motor 127 through shaft 128 which is operably coupled to shaft 88 by pulley 138 on shaft 128, pulley 140 on shaft 88 and the endless belt 142 trained over pulleys 138 and 140. The pinion 144 on shaft 88 in operable engagement with pinion 146 on shaft 148 causes the latter to be driven at a predetermined speed and effecting rotation of shaft 108 through the pulley 150 on shaft 148, the pulley 154 on shaft 108, and endless belt 152 interconnecting pulleys 150 and 154. The shaft 108 drives shaft 160 through pulleys 156 and 158 interconnected by belt 162 while the shaft 106 is in turn rotated by shaft 168 by virtue of operable interengagement of pinions 164 and 166 on shafts 160 and 168 respectively, while pulley 176 on shaft 106 is operably connected to the pulley 174 on shaft 168 by endless belt 178. It can be seen that the shafts 106 and 108 are thereby rotated simultaneously in opposite directions and at the same speed. It is also of significance to note that shafts 106 and 108 are rotated at a speed to cause the rollers 110 and 112 to be turned at a speed somewhat greater than the speed at which devices 102 deliver wrappers 52 to feed rollers 110 and 112 to thereby assure effective delivery of wrappers 52 to the first folding station regardless of the height of stack 98 of wrappers 52 within hopper 50.

The uppermost wrapper 52a is delivered to drive rollers 110 and 112 for passage therebetween by the devices 102 mounted on members 100 which are in turn carried by rotatable shaft 82. Drive shaft 128, which in turn drives shaft 88 as outlined above, also effects rotation of shaft 82 through pulley 94 on shaft 88, pulley 90 on shaft 82, and the endless belt 92 trained over pulleys 90 and 94 respectively. During rotation of shaft 82, the members 100 are rotated in a counterclockwise direction, as shown in FIG. 5 to thereby cause the devices 102 to move into frictional engagement with the uppermost wrapper 52a and thereby force the latter along the upper face of downturned portions 104a of guide plate 104 and into the space between support plate 44 and horizontal section 104b of plate 104. The pointed elements 81 piercing the upper wrapper 52a in the stack 98 thereof prevent more than one wrapper 52 from being directed along guide plate 104 and thereby between rollers 110 and 112, each time the devices 102 are rotated into a position to engage the uppermost wrapper 52a of stack 98.

The shaft 82 is swingable through a vertical arc so that the discs 96 remain in firm engagement with the uppermost wrapper 52a regardless of the height of stack 98 and as the level of the stack is lowered, the force with which discs 96 engage the wrappers 52 remains substantially constant. In this manner, the same amount of frictional force is placed on the uppermost wrapper 52a by the devices 102 during rotation of shaft 82 to move the devices 102 into engagement with wrappers 52, and therefore displacement of only one wrapper during each cycle of rotation of shaft 82 is assured.

Inasmuch as the rollers 110 and 112 are rotating at a slightly faster rate than the speed at which the uppermost wrapper 52a is being advanced toward rollers 110 and 112, it can be perceived that the rollers 110 and 112 pull the wrapper from beneath the devices 102 and direct such wrapper rearwardly between support plate 44 and horizontal section 104b of guide plate 104. The wrapper 52a is forced along the upper surface of guide plate 104 at a sufficient speed that the margin thereof moves across the opening between guide plate 104 and support plate 186 with the wrapper continuing its movement until the forwardmost margin thereof engages the alignment elements 202 between plates 204 and the upper surface of wrapper support plate 186. The wrapper 52a is forced between rollers 110 and 112 simultaneously with advancement of the lowermost newspaper 30a by mechanism 692. The shaft 734 is oscillated through a predetermined arc by shaft 88 through the crank arm 744 on shaft 88 and which is operably connected to the crank arm 740 on shaft 734 by link 742. Oscillation of shaft 734 causes crank arm 732 to oscillate therewith and thus effecting reciprocation of connecting rods 724 which are joined to pusher plates 710 by corresponding pin means 712. During oscillatory movement of crank arm 732 in a counterclockwise direction viewing FIG. 12, the connecting rods 724 are moved toward the front of apparatus 10, thereby shifting the pusher plates 710 along the underside of corresponding bottom wall 700 of L-shaped member 694. The pin means 712 slide along corresponding inclined slots 702 in bottom walls 700 while pin means 714 on each pusher plate 710 slide along the outer, generally rectilinear slots defined by corresponding island plates 706 positioned in openings 704. When the crank arms 732 have reached the forwardmost point of their path of travel, the pin means 712 will be positioned adjacent the forwardmost extremity of corresponding slots 702 and with pin means 714 located within the arcuate portion of each of the margins 704c of bottom walls 700 defining openings 704.

Rearward movement of the crank arms 732 toward rollers 110 and 112 causes the connecting rods 724 to be shifted rearwardly thereby forcing the pusher plates 710 to be shifted with rods 724 toward the first folding station. During such rearward movement of pusher plates 710, the pin means 712 shift along the rectilinear path defined by respective slots 702, while the pin means 714 move along the margin 704 of corresponding bottom wall 700 and defined by margins 704c and 704b. During movement of pin means 714 along the innermost edges of island plates 706, the extremities 710b of segments 710a on pusher plates 710 move into overlying relationship to bottom portion 38a of panel 38 below the lower margin of corresponding panels 39. The extremities 710a of pusher plates 710 thereby knife into the lowermost paper 30a between the overlapped folds thereof and engage the zone of merger of such folds to cause the lowermost paper 30a to be shifted toward rollers 110 and 112 and beneath the lower margin of guide plate 40. As indicated earlier, the guide plate 40 has been adjusted so that the lower margin thereof clears only the lowermost paper 30a during shifting of the latter toward rollers 110 and 112 to preclude other papers from being directed toward the first fold station notwithstanding considerable weight being placed on the lower paper 30a by virtue of the remaining papers of the stack 46 thereof resting directly on the lowermost paper 30a. The support plate 44 receives the leading edge of the lower paper 30a and guides the same directly between rollers 110 and 112. These rollers advance paper 30a toward the first fold station and it is to be noted that shaft 106 as well as the rollers 112 thereon may shift vertically through a sufficient arc to compensate for the thickness of paper 30a. This is an extremely important feature of the drive mechanism for removing paper 30a from the stack 46 thereof inasmuch as it permits newspapers of varying thickness to be folded with apparatus 10. For example, Sunday newspapers will be substantially thicker than Saturday evening papers and thus the present mechanism automatically compensates for the thickness of a particular paper. The shaft 106 is free to swing vertically against the action of springs 191 and 193 with openings 185 in plates 14 and 16 clearing shaft 106 during vertical movement thereof.

As soon as the newspaper 30a is between rollers 110 and 112, the same advance the newspaper toward the first fold station ahead of movement of the pusher plates 710 which continue to follow respective closed loops defined by openings 704 and the island plates 706 positioned therewithin.

The rollers 110 and 112 force the newspaper 30a along the upper surface of plate 44 and under finger 122 which prevents the paper from engaging the stops 220 or 228 and bouncing back toward rollers 110 and 112. The disposition of paper 30a and wrapper 52a at the initial fold station therefor, is illustrated schematically in FIG. 15.

The newspaper 30a and wrapper 52a underlying the same are now folded in half by mechanism 282 which is oscillated in a manner such that tucker blade 290 is shifted down toward the space between guide plate 104 and wrapper support plate 186, as soon as the newspaper 30a and wrapper 52a have been shifted into the disposition of the same shown in FIG. 15. Oscillation of mechanism 282 is effected by shaft 134 which is rotated in a clockwise direction as shown in FIG. 5 through interengaging pinions 130 and 132. Rotation of the cam 316 with shaft 134 causes the cam follower 334 on shaft 332 to move in groove 336 in cam 316 whereby link 308 is pivoted about pin 310 to reciprocate link 312 and thereby pivot arms 284 about the axis of shaft 288. During counterclockwise movement of arms 284 viewing FIG. 3, the tucker blade 290 is shifted downwardly into engagement with the central transversely extending area of newspaper 30 carried by plate 44 and plate 86, whereby newspaper 30a and wrapper 52a are forced downwardly into the space between rollers 280 and cam 250 as illustrated in FIGS. 15 and 16. Slight pivoting movement of tucker blade 290 is permitted relative to arms 284 and against the action of springs 306 to compensate for the thickness of the paper 30a which is being folded in half transversely thereof. Since the fingers of tucker blade 290 engage the central part of paper 30a, the same is folded substantially in half as shown in FIG. 16, with the margin of the fold being forced into the area between the peripheral surfaces of rollers 280 and the circular surfaces 252 at the point where the main surfaces 252 merge with concave surfaces 256 thereon. Thus, during continued rotation of cams 250 and rollers 280 in opposite directions as indicated in FIGS. 15 and 16, the folded newspaper 30a is forced downwardly toward trough 372 with the wrapper 52 being positioned over the outer faces of the newspaper. The shaft 262 and the rollers 280 thereon are free to swing away from cams 250 as the folded newspaper passes therebetween, because of the way in which shaft 262 is mounted for swinging movement within arcuate slots 260 in upright plates 14 and 16. It is to be noted that the springs 268 and 270 bias shaft 262 toward cams 250 to thereby maintain the rollers 280 in firm engagement with the outer face of the wrapper 52a around newspaper 30a and to assure firm engagement of the outer surface of cams 250 with the opposed face of wrapper 52a.

Continued rotation of the cams 250 causes the S-shaped surfaces 254 thereof to move into opposed relationship to the folded newspaper 30a and to thereby cause the elements 258 to engage wrapper 52a overlying the outer opposed face of the newspaper. The newly folded margin of the paper is forced downwardly until the same engages the inclined leg segments 374 and 378 of the trough 372.

The elements 259 on rollers 280 cooperate with the elements 258 on cams 250 to pinch the folded newspaper 30a and wrapper 52a therebetween and thus permit the tucker blade 290 to be withdrawn from the folded paper without displacement of the same from the wrapper 52a. The elements 258 and 259 also provide a firm grip on wrappers of slick material which would not be firmly engaged by smooth surfaced components such as the rollers 280.

FIG. 17 schematically illustrates the next folding action on the newspaper 30a and it can be seen that shaft 134 carrying cam 364 thereon has been rotated through an arc to bring the semicircular cam surface 366 into engagement with cam arm 370 to rotate shaft 358 in a clockwise direction viewing FIG. 5, whereby the presser fingers 362 are forced into firm engagement with the segment 52a' of wrapper 52a to thereby hold such segment in firm engagement with the proximal outer face of the double folded newspaper 30a. As soon as the presser fingers 362 have been forced against the segment 52a' of wrapper 52a, the cams 250 rotate through an additional arc sufficient to cause the zone of merger of concave surfaces 256 and cylindrical surfaces 252 to engage the opposed marginal segment 52a'' of wrapper 52a and thereby fold such segment downwardly and over the shegment 52a' of wrapper 52a and thus producing a double fold overlying the outer face of the newspaper. This double fold is important in increasing the water imperviousness of package 750 inasmuch as the next fold in the paper 30a produces a trough in the face of the paper which is covered by segments 52a' and 52a'' which would tend to permit water to flow into the package 750 and soaking the newspaper 30a without the double protection afforded by segments 52a' and 52a''.

It is to be understood that as the folded newspaper 30a having the wrapper 52a therearound is directed toward the next folding station, another wrapper and newspaper are being moved into disposition overlying cams 250 and rollers 280 for an additional folding operation. Direction of a second paper and wrapper into the first fold station simultaneously with folding of the newspaper 30a and wrapper 52a materially increases the efficiency of apparatus 10.

The leading margin of the concave surfaces 256 of cams 250 also engage the upper edge of the folded newspaper 30a while the latter is positioned on trough 372 to shift the folded paper from the vertical disposition thereof into a horizontal location, as illustrated in FIG. 18, and thereby between the cylindrical surfaces 252 of cams 250 and the cylindrical surfaces of rollers 356 on shaft 340. During turning of the folded newspaper by cams 250, the fingers 388 engage the wrapper 52a around paper 30a and hold the central section of the wrapper in engagement with paper 30a until the folded paper is fully received between cams 250 and rollers 356 for conveyance horizontally toward the second folding station of apparatus 10. The fingers 388 thereby prevent the rollers 356 from engaging the wrapper 52a around paper 30a until the folded paper is shifted by the notched cams 250. If the wrapped paper was permitted to engage rollers 356 prior to being moved between cams 250 and rollers 356, the latter could under certain circumstances remove the wrapper 52a by sliding action from the paper 30a. The rollers 356 are driven in a direction opposite to the direction of rotation of cams 250 by virtue of the shaft 340 being driven from shaft 134 through pulleys 346 and 344 interconnected by endless belt 348. It is apparent that the shaft 340 and thereby the rollers 356 thereon may shift downwardly with respect to cams 250 as the folded newspaper passes between the rollers 356 and cams 250, with the shaft 340 being swingable through an arc defined by slots 338 in plates 14 and 16 respectively. Springs 350 maintain equal tension on opposite ends of shaft 340 and bias rollers 356 toward cams 250 to assure proper frictional engagement of the surfaces of cams 250 and rollers 356 with wrapper 52a over newspaper 30a.

Cams 250 and rollers 356 shift the folded newspaper 30a rearwardly until the leading edge thereof engages plate 394 which serves to tilt the paper in an upward direction so that the same may slide upwardly across the upper face of swingable plate 396. The newspaper continues along the upper face of plate 396 until the leading edge of the newspaper slides across the upwardly facing surface of platform 410 and is precluded from further rearward movement by the end plates 422. The arms 406 rotatably mounted on shaft 242 engage the segment 52a″ of wrapper 52a during transfer of newspaper 30a onto platforms 396 and 410 to maintain segment 52a″ in engagement with the folded newspaper until the tucker blade 426 has been moved into disposition contacting segment 52a″ as will be clear hereinafter. As indicated in FIG. 21, the newspaper 30a is released by cams 250 and rollers 356 by the time such newspaper strikes the end plates 422 and is thereby supported by platform 410 and plate 394.

As indicated in FIG. 18, during horizontal transfer of the folded newspaper by cams 250 and rollers 356, the tucker blade 426 of second fold mechanism 424 is being moved rearwardly along an arcuate path of travel defined by the circular portions 439a of slots 439 in plates 14 and 16. As explained in detail heretofore, the tucker blade 426 is pivotally carried by an arm 442 on plate 14 and a bracket 448 on plate 16. Movement of tucker blade 426 is controlled by swinging of bracket 448 during oscillation of connector link 462 under the control of link 460 rotatable with shaft 242. As best illustrated in FIG. 2, shaft 242 is rotated by power shaft 128 through pulleys 138 and 244 which are interconnected by endless belt 246. Oscillation of tucker blade 426 is synchronized with advancement of the folded newspaper by cams 250 and rollers 356 so that when the folded newspaper is shifted into the disposition thereof best shown in FIG. 21, the tucker blade 426 is being returned from the rearmost position thereof in arcuate portions 439a of slots 439 and is thereby intermediate the extremities of the arcuate portions of the J-shaped slots to cause the lower extremity of blade 426 to engage the folded newspaper in the central area thereof transversely of the same and directly against the outwardly facing surface of the segment 52a″ of wrapper 52. During continued downward movement of tucker blade 426 as bracket 448 is additionally rotated in a clockwise direction viewing FIG. 3, under the control of links 460 and 462 secured to shaft 242, the lowermost extremity of the tucker blade 426 forces the central part of the folded newspaper 30a downwardly between platforms 396 and 410. The platform 396 swings about the axes of pivot pins 400 against the action of coil springs 402 while platform 410 pivots downwardly as the cranks 412 carrying the same pivot about corresponding pivot means 414. The disposition of bracket 448 and links 460 and 462 at the time the tucker blade 426 initially engages the folded newspaper 30a, is schematically illustrated in FIG. 20.

During downward and rearward movement of the folded newspaper under the influence of tucker blade 426, the outer, rearwardly facing segment 52a‴ of wrapper 52a brushes against the free end of tape 662 to thereby cause such tape to adhere to the wrapper 52. The tucker blade 426 effects folding of the newspaper in half transversely thereof as shown in FIG. 23 and forces such thrice folded newspaper downwardly into crushing means 516 between the fingers 540 thereof. The rocking motion of U-shaped folded paper and crushing means 516 is controlled so that the links 570 and 572 operably coupled to shaft 490, are in the disposition thereof illustrated in FIG. 23, at the time tucker blade 426 forces the newspaper 30a downwardly between platforms 396 and 410 during swinging movement of the latter about respective axes of pivoting of the same. The fingers 540 on units 536 and 538 respectively serve to effect full folding of the newspaper 30a in half inasmuch as the distance between opposed fingers 540 is preferably somewhat less than the normal thickness of the folded paper to thereby impart a crushing action to the newspaper and also require the fingers 540 to bend outwardly a certain extent to assure a firm pressure on the paper. This pressure is required to prevent the tucker blade 426 from pulling one of the free ends of the wrapper 52 out of the trough in the paper, upon retraction of tucker blade 426 to the initial disposition thereof as shaft 242 continues to rotate.

The width between opposed fingers 540 on units 536 and 538 may be adjusted for newspapers of different initial thickness, by simply manually rotating the operating handle 546 which simultaneously turns threaded members 532 to shift units 536 and 538 toward and away from each other. The endless chain 544 trained over sprockets 542 on threaded members 532 and 534 causes rotation of the threaded members through equal arcs during operation of handle 546.

The twister members 590 are disposed in the positions illustrated in FIG. 21, during downward movement of the newspaper as the same is forced into and folded by means 516, to thereby cause the outer marginal portions of the wrapper 52a which extend beyond respective extremities of the folded newspaper 30a, to be received in corresponding twister members 590 with the ends of the wrapper 52a crimped between legs 600 and 602 of corresponding members 590.

As soon as the tucker blade 426 has been retracted from the thrice folded newspaper 30a shaft 490 is rotated to rock folded newspaper and crushing means 516 into the ejection position of the same as shown in FIG. 25. Rocking of means 516 at the correct instant is effected by the mechanism operably coupled to shaft 490 and mounted on the outer face of plate 14 in proximity to such shaft. The drive crank member 476 swingably mounted on link 474 is moved in a circular path of travel during rotation of shaft 242 by shaft 128 with crank member 476 being rotated in a counterclockwise direction viewing the schematic illustration of FIG. 24. Thus, during a portion of the arcuate path of travel of crank member 476 the same does not produce consequent oscillation of crank 570 by virtue of the lost motion provided during shifting of the stub shaft 498 in the slot 496 at the lowermost extremity of leg 480 of crank 476. During the remaining portion of the arcuate path of travel of crank member 476, the leg 480 of crank member 476 forces the link 494 on shaft 490 toward the newspaper receiving and crushing means 516, thereby rotating shaft 490 in a clockwise direction as shown in FIGS. 23 and 24 to pull links 570 and 572 forwardly and thus effecting rocking movement of means 516 in a clockwise direction about the axes of stub shafts 518 and 520.

As means 516 is swung into the ejection position of the same as illustrated in FIG. 25, the tape 662 is brought across the trough portion of the thrice folded newspaper and is forced against the outer face of the wrapper 52a on the portion thereof opposed to the face initially contacted by such tape as the paper was forced downwardly by tucker blade 426.

The ends of the wrapper 52a are twisted during swinging of means 516 into the ejection position by virtue of arms 584 on respective shafts 518 and 520 being forced to turn therewith whereby the pinions 594 are rotated as the same move along arcuate racks 598. Swinging of arms 584 through a path of travel limited by blocks 604 on the outer faces of plates 14 and 16, causes the pinions 594 to be rotated at a relatively high rate of speed to turn the twister members 590 an equal number of turns to thereby effectively twist the outer end portions of the wrapper 52a which project beyond opposite extremities of the thrice folded newspaper 30a.

During rocking of means 516 by drive crank member 476, the stub shaft 498 is received in notch 512 of release member 504 which serves to maintain the shaft 498 at the upper extremity of slot 496 even past the time that the leg 480 of drive crank member 476 would normally shift with respect to shaft 498. The release member 504 continues to maintain stub shaft 498 locked to leg 480 of crank member 476 until the leg 508 of release member 504 engages roller 488 which effects swinging movement of release member 504 about the axis of pivot pin 506 to release stub shaft 498 from notch 512 in leg 510 of release member 504 (FIG. 22).

The automatic taping mechanism 606 is also actuated by means 516 during swinging thereof inasmuch as the roller 556 on cross member 554 engages the outer end of bar 688 swingably mounted on platform 676 of frame member 608 to thereby cause the blade 680 to be shifted outwardly through the slot therefor in block 678 on the extremity 608b of frame member 608. The tape 662 is positioned across the slot for blade 680 and is under tension by virtue of the fact that the free end of the tape is adhesively secured to the wrapper 52a on the folded newspaper 30a and the paper is being shifted rearwardly under the swinging action of means 516. Thus, the sharp projection 680c of blade 680 initially pierces the tape 662 and maintains proper tension on the same until the tape can be severed by the beveled edge 680b on the forward extremity of blade 680. Prior to severing of the tape 662 by blade 680, it is to be pointed out that the tape extends over the roller 552 on pin 550 carried by the upper extremity of member 548. The roller 552 serves to relieve the tension on the tape during swinging of the folded newspaper by means 516 and thereby precludes the tape from being torn loose from the wrapper or, in the alternative, actually severing a portion of the wrapper from the face which is initially contacted by the adhesive securing member.

It is also to be noted that during return of tucker blade 426 to the disposition thereof adjacent the rearmost extremity of respective slots 439, the upper margin of blade 426 or a cam member thereon if desired, engages the pusher member 626 to swing the latter rearwardly about pivot pin 628 and thereby effecting rotation of shaft 612 through the link 630 swingably secured to the crank 622. The crank arm 614 also secured to shaft 612 is thereby swung in a clockwise direction as shown in FIG. 8, to cause the roller 670 to be moved upwardly and pulling a length of free tape as the check blade 666 is pulled rearwardly about the axis of pivot pin 668 and with the lowermost edge 666a of blade 666 in binding engagement with the upper face of the tape 662. In this manner, sufficient free tape is provided to assure that the same is properly wrapped around the wrapper 52a as the same is rotated by means 516 for subsequent ejection.

It is also to be pointed out that during folding of the newspaper by tucker blade 426, the swinging of platform 410 downwardly by the newspaper results in the entire taping mechanism 606 being swung upwardly so that the free end of the tape 662 is always in a proper position to engage the outer surface of the wrapper 52a, regardless of the thickness of the newspaper and which varies from edition to edition thereof.

When the arms 584 on shafts 518 and 520 contact blocks 604, the folded newspaper and crushing means 516 cannot rotate any further in a clockwise direction viewing FIG. 5, but the links 570 continue to move toward the front end of apparatus 10 notwithstanding discontinuance of pivoting movement of shafts 518 and 520 and the structure mounted thereon. As the links 572 are shifted by links 570 in a direction away from means 516, the member 566 is moved away from angle 526 and strap 528 to thereby pull the links 564 in a direction away from units 536 and 538 and resulting in swinging of blocks 560 about corresponding pivot pins 567. Pivoting of blocks 560 in opposite directions under the pulling action of links 564, results in the ejector arms 563 being swung away from blocks 530 and causing the folded newspaper to be ejected from between the fingers 540 on units 536 and 538. During ejection of the newspaper, the opposed smoothing fingers 605 and 672 engage the severed length of the tape 662 and force the same into firm engagement with the outer surface of the wrapper 52a across the trough therein, as best shown in FIG. 25. Reference is also made to FIG. 26 which shows the disposition of the ejector arms 563 when the same have been swung outwardly by links 570 and 572 during oscillation by shaft 490. It can also be seen in FIG. 26 that when the pinions 594 are at the ends of their paths of travel adjacent blocks 604, the twister members 590 are disposed with the legs 600 and 602 thereof facing outwardly in the direction of fingers 540 on units 536 and 538 to permit the twisted extremities of the wrapper 52a to be ejected from corresponding members 590 by the members 563.

It should again be emphasized that the cyclic operation of apparatus 10 is such that during formation of the second fold in the paper 30a by tucker blade 426, another newspaper is being directed downwardly into trough 372 by first tucker blade 290. Furthermore, during ejection of a folded newspaper from means 516, the paper which has been folded once by cams 250 and rollers 280 is being directed toward disposition on platforms 396 and 410.

When the supply of newspapers 30 on panel 38 is exhausted, the switch 746 will open, thereby interrupting the current to motor 127 and discontinuing operation of apparatus 10 until more newspapers have been placed in the hopper presented by panel 38 to thus again close switch 746 as the papers shift arm 748 downwardly.

One especially important feature of apparatus 10 is the manner in which second fold mechanism 424 operates to fold the newspaper 30a and wrapper 52a in half transversely thereof after initial folding of the same by first fold tucker mechanism 282. When the newspaper 30a and wrapper 52a are supported by plates 44 and 186, it can be seen that the first fold is formed in the paper and wrapper by the tucker blade 290 moving downwardly and engaging the upper surface of newspaper 30a to crease the latter transversely thereof and shift the same downwardly between cams 250 and rollers 280. However, when the twice folded newspaper has been moved onto platforms 396 and 410, it can be recognized that the paper is now more difficult to fold because of the thickness of the same, this being especially true of very large editions such as are published on Sunday. A downwardly moving tucker blade disposed to engage the central portion of the twice folded newspaper to effect folding thereof in the same manner as accomplished by tucker blade 290, would encounter considerable resistance because of the thickness of the paper and in certain instances, would require excessive power or fail to fold the paper in a proper manner. In order to overcome this problem, it is to be noted that the leading edge of the folded paper, when the latter is positioned on platforms 396 and 410, is clamped between the lower margin of tucker blade 426 and the platform 410 and that the platform 410 rotates about the axis of pivot means 414 in conjunction with arcuate movement of tucker blade 426. Thus, the paper is creased by a rolling over of the leading edge into proximity to the trailing edge of the newspaper and the lower margin of blade 426 operates primarily to assure folding of the newspaper along the central transverse area of the same rather than downward creasing of the paper, as occurs at the first folding station. This action has been found to assure proper folding of even very large editions of papers and also allows the mechanism to automatically compensate for papers of different thickness without adjustment of the components being required.

Although the description above has been directed especially to wrapping of a newspaper with a waterproof wrapper of greater transverse width than that of the paper itself, it is to be understood that other types of wrappers may be used with equal success. For example, a waterproof wrapper of substantially the same width as the newspaper may be used and without the provision of the twisted ends which serve to preclude entrance of moisture into opposed ends of the completed package. Furthermore, the newspapers 30 may be packaged in kraft wrappers or in newsprint if desired, this being especially attractive from the standpoint that the wrapper may be printed with advertising materials or the like to provide additional revenue for the newspaper distributor.

Having thus described the invention what is claimed as new and desired to be secured by Letters Patent is:

1. Apparatus for packaging newspapers comprising means for receiving a number of newspapers in stacked relationship; means for receiving a stack of protective wrappers for said newspapers; means engageable with one of the newspapers and one of the wrappers in respective stacks thereof for shifting the same into superimposed relationship with one margin of the wrapper projecting outwardly from the adjacent edge of the newspaper; means positioned to engage said one newspaper and said one wrapper and fold the same in half transversely thereof in a direction to cause the wrapper to be disposed on the normally outer face of the folded newspaper; means operable to fold said one margin of the wrapper over the adjacent superimposed edges of the newspaper and against the normally outer face of the wrapper; means positioned to engage the face of the wrapper having said one margin folded thereover and operable to again fold the newspaper in half transversely thereof in a direction with the wrapper still disposed on the outer face of the folded newspaper and said one margin of the wrapper located between the last formed folds in the newspaper; and means for applying a member to the outer face of the one wrapper around said one newspaper to maintain the latter in the fully folded condition thereof.

2. Apparatus for packaging newspapers comprising means for receiving a number of newspapers in stacked relationship; means for receiving a stack of protective wrappers for said newspapers; means engageable with one of the newspapers and one of the wrappers in respective stacks thereof for shifting the same into superimposed relationship with one margin of the wrapper projecting outwardly from the adjacent edge of the newspaper; means positioned to engage said one newspaper and said one wrapper and fold the same in half transversely thereof in a direction to cause the wrapper to be disposed on the normally outer face of the folded newspaper; means operable to fold said one margin of the wrapper over the adjacent superimposed edges of the newspaper and against the normally outer face of the wrapper; means positioned to engage the face of the wrapper having said one margin folded thereover and operable to again fold the newspaper in half transversely thereof in a direction with the wrapper still disposed on the outer face of the folded newspaper and said one margin of the wrapper located between the last formed folds in the newspaper; and means for applying an adhesive member to the outer face of the one wrapper around said one newspaper and across the exposed extremity of the wrapper to maintain said one newspaper in the fully folded condition thereof.

3. Apparatus for packaging newspapers comprising means for receiving a number of newspapers in stacked relationship; means for receiving a stack of protective wrappers for said newspapers, said wrappers being of greater width than the newspapers; means engageable with one of the newspapers and one of the wrappers in respective stacks thereof for shifting the same into superimposed relationship with one margin of the wrapper projecting outwardly from the adjacent edge of the newspaper; means positioned to engage said one newspaper and said one wrapper and fold the same in half transversely thereof in a direction to cause the wrapper to be disposed on the normally outer face of the folded newspaper; means operable to fold said one margin of the wrapper over the adjacent superimposed edges of the newspaper and against the normally outer face of the wrapper; means positioned to engage the face of the wrapper having said one margin folded thereover and operable to again fold the newspaper in half transversely thereof in a direction with the wrapper still disposed on the outer face of the folded newspaper and said one margin of the wrapper located between the last formed folds in the newspaper; and means positioned to engage the portions of the one wrapper extending outwardly from respective extremities of said one newspaper for twisting said outer portions of the wrapper to preclude entrance of moisture into the packaged newspaper.

4. Apparatus for packaging newspapers comprising means for receiving a number of newspapers in stacked relationship; means for receiving a stack of protective wrappers for said newspapers, said wrappers being of greater width than the newspapers; means engageable with one of the newspapers and one of the wrappers in respective stacks thereof for shifting the same into superimposed relationship with one margin of the wrapper projecting outwardly from the adjacent edge of the newspaper; means positioned to engage said one newspaper and said one wrapper and fold the same in half transversely thereof in a direction to cause the wrapper to be disposed on the normally outer face of the folded newspaper; means operable to fold said one margin of the wrapper over the adjacent superimposed edges of the newspaper and against the normally outer face of the wrapper; means positioned to engage the face of the wrapper having said one margin folded thereover and operable to again fold the newspaper in half transversely thereof in a direction with the wrapper still disposed on the outer face of the folded newspaper and said one margin of the wrapper located between the last formed folds in the newspaper; rotatable means positioned to engage the portions of the one wrapper extending outwardly from respective extremities of said one newspaper while the latter is located in a stationary position for twisting said outer portions of the wrapper to preclude entrance of moisture into the packaged newspaper; and means for applying a member to the outer face of the one wrapper around said one newspaper and across the exposed extremity of the wrapper to maintain said one newspaper in the fully folded condition thereof.

5. Apparatus for packaging newspapers having an initial transverse fold therein, said apparatus comprising hopper means having opposed side margins and adapted to receive a number of newspapers each folded in half and located in stacked relationship; means for receiving a stack of protective wrappers for said newspapers; shiftable blade means adjacent each side margin of the hopper means; mechanism operably coupled to said blade means for initially moving the same toward each other and into positions between the overlapped folds of one of the newspapers of said stack and into engagement with the transverse zone of interconnection of the folds for thereafter shifting said blade means along elongated, generally rectilinear paths in substantially perpendicular relationship to said transverse zones of interconnection of the folds to shift said one newspaper therewith to a location remote from said stack of newspapers, for then shifting the blade means away from each other to effect withdrawal thereof from said one newspaper, and for finally returning the blade means to the initial locations of the same; means engageable with one of the wrappers in said stack thereof for shifting said one wrapper to said location and in alignment with said one newspaper while the latter is at said location; means positioned to engage said one newspaper and said one wrapper and fold the same in half transversely thereof at least one fold in a direction to cause the wrapper to be disposed on the normally outer face of the folded newspaper; and means for applying a securing member to the folded newspaper for maintaining the latter in said folded condition thereof.

6. Apparatus for packaging newspapers comprising a unit having means for receiving a number of newspapers in stacked relationship and means for receiving a stack of protective wrappers for said newspapers; common power means on said unit operable to substantially simultaneously move one of said newspapers and one of said wrappers from respective stacks thereof, to a location remote from said stacks and in superimposed relationship; means for successively folding said one newspaper and said one wrapper in half transversely thereof at a plurality of spaced stations and with a portion of the wrapper positioned on the outwardly facing surface of the newspaper to protect the latter; means spaced from said stations for applying a securing member to the folded newspaper for maintaining the latter in said folded condition thereof; and means for sensing the presence of newspapers in said receiving means therefor to inactivate said common power means upon exhaustion of newspapers from said newspaper receiving means.

7. Apparatus for packaging newspapers comprising a unit having means for receiving a number of newspapers in stacked relationship and means for receiving a stack of protective wrappers for said newspapers; means on said unit for substantilaly simultaneously moving one of said newspapers and one of said wrappers from respective stacks thereof, to a location remote from said stacks and in superimposed relationship with one margin of the wrapper projecting outwardly from the adjacent edge of the newspaper; means on said unit and engageable with the central portion of said one newspaper transversely thereof for shifting said one newspaper and the wrapper aligned therewith into another location simultaneously with folding of said one newspaper in half with a portion of the wrapper positioned on the outwardly facing surface of the newspaper; means operable to fold said one margin of the wrapper over the adjacent superimposed edges of the newspaper and against the normally outer face of the wrapper; means on the unit engageable with an area of the wrapper proximal to the central portion of the folded newspaper and extending transversely thereof for shifting the folded newspaper into a third location while holding said one margin of the wrapper flatly against the proximal outer face of the wrapper and simultaneously with folding of the one newspaper in half in a direction with the wrapper remaining on the outer exposed surface of the newspaper and said one margin of the wrapper located between the last formed folds in the newspaper; means on said unit for shifting the folded newspaper into a fourth location; and means at said fourth location for applying a securing member to the folded newspaper for maintaining the latter in said folded condition thereof.

8. Apparatus for packaging newspapers comprising a unit having means for receiving a number of newspapers in stacked relationship and means for receiving a stack of protective wrappers for said newspapers; means on said unit for substantially simultaneously moving one of said newspapers and one of said wrappers from respective stacks thereof, to a first location remote from said stacks with the one newspaper and the one wrapper being disposed in superimposed relationship with the wrapper underlying the newspaper, said wrapper being of greater width transversely thereof than the corresponding width of said newspaper; means on said unit and engageable with the central portion of said one newspaper transversely thereof for shifting said one newspaper and the wrapper aligned therewith into another location simultaneously with folding of said one newspaper in half with a portion of the wrapper positioned on the outwardly facing surface of the newspaper; means on the unit engageable with an area of the wrapper proximal to the central portion of the folded newspaper and extending transversely thereof for shifting the folded newspaper into a third located simultaneously with folding of the one newspaper in half and with the wrapper remaining on the outer exposed surface of the newspaper; means on said unit for shifting the folded newspaper into a fourth location; a pair of rotatable, generally J-shaped elements at said fourth location normally disposed to receive respective opposed portions of said one wrapper extending outwardly from respective extremities of the one newspaper as the latter is shifted toward said fourth location and while said one newspaper is located in a stationary position for twisting said outer portions of the wrapper to preclude entrance of moisture into the packaged newspaper; and means for applying the securing member to the outer face of the one wrapper and across the exposed extremity thereof to maintain said one newspaper in the fully folded condition thereof.

9. Apparatus for packaging newspapers comprising a unit having means for receiving a number of newspapers in stacked relationship and means for receiving a stack of protective wrappers for said newspapers; means on said unit for substantially simultaneously moving one of said newspapers and one of said wrappers from respective stacks thereof, to a location remote from said stacks and in superimposed relationship with one margin of the wrapper projecting outwardly from the adjacent edge of the newspaper; means on said unit and engageable with the central portion of said one newspaper transversely thereof for shifting said one newspaper and the wrapper aligned therewith into another location simultaneously with folding of said one newspaper in half with a portion of the wrapper positioned on the outwardly facing surface of the newspaper; means operable to fold said one margin of the wrapper over the adjacent superimposed edges of the newspaper and against the normally outer face of the wrapper; means on the unit engageable with an area of the wrapper proximal to the central portion of the folded newspaper and extending transversely thereof for shifting the folded newspaper into a third location while holding said one margin of the wrapper flatly against the proximal outer face of the wrapper and simultaneously with folding of the one newspaper in half in a direction with the wrapper remaining on the outer exposed surface of the newspaper and said one margin of the wrapper located between the last formed folds in the newspaper; means on said unit for shifting the folded newspaper into a fourth location; means at said fourth location for applying a securing member to the folded newspaper for maintaining the latter in said folded condition thereof; and means at said fourth location engageable with said folded newspaper having a securing member thereon, for ejecting the packaged newspaper from said unit.

10. In apparatus for packaging newspapers having an initially transverse fold therein and provided with structure for receiving a number of such newspapers in stacked relationship and structure for receiving a stack of protective wrappers for said newspapers, the combination of means for shifting one newspaper of said stack thereof toward a location remote from said stack of newspapers and including a pair of generally horizontally shiftable pusher plates having outwardly projecting extensions thereon, and drive means operably coupled to each of said plates for simultaneously moving the latter along a predetermined, closed, polygonal, oscillatory path of travel with one portion of each of the paths of travel of said plates overlapping opposed margins of said stacks of newspapers whereby the extension on each of the plates moves between the overlapped folds of one of the newspapers to effect movement of the latter toward said location during operation of said plates and without tearing of the newspapers at said zone of interconnection of the folds, and means engageable with one of the wrappers in said stack thereof for shifting said one wrapper to said location and in alignment with said one newspaper while the latter is at said location.

11. Apparatus as set forth in claim 10 wherein is provided opposed roller means adjacent said newspaper shifting plates and positioned to receive the margin of said one newspaper shifted by said extensions on the plates during movement thereof for receiving said one newspaper therebetween and conveying the same to said location, and means for continuously driving said roller means at a predetermined speed.

12. Apparatus as set forth in claim 11 wherein is provided shaft means disposed to overlie the wrappers in said stack thereof and having rotatable means thereon for movement with said shaft means, said rotatable means being provided with a frictional element on the outer periphery thereof disposed to engage the face of the uppermost wrapper in said stack thereof for moving the uppermost wrapper toward said location in response to rotation of said shaft means, said structure for receiving the wrappers being disposed in a position to cause the uppermost wrapper to be shifted into disposition received between said roller means when said one wrapper is moved toward said location by the frictional element on said shaft means.

13. Apparatus as set forth in claim 10 wherein is provided plate means adjacent each of said pusher plates and each having a centrally disposed slot of closed loop configuration therein, each of said pusher plates being provided with projection means thereon slidably disposed within corresponding closed loop slots in said plate means whereby upon shifting movement of said pusher plates, the same move along a path of travel delineated by corresponding closed loop slots in said plate means.

14. Apparatus as set forth in claim 10 wherein is provided shaft means disposed to overlie the wrappers in said stack thereof and having rotatable means thereon for movement with said shaft means, said rotatable means being provided with a frictional element on the outer periphery thereof disposed to engage the face of the uppermost wrapper in said stack thereof for moving the uppermost wrapper toward said location in response to rotation of said shaft means.

15. In apparatus for packaging newspapers having an initial fold therein provided with structure for receiving a number of such newspapers in stacked relationship and a stack of protective wrappers for said newspapers and having mechanism for shifting one of the newspapers and one of the wrappers to a location in superimposed aligned relationship with the wrapper underlying said one newspaper, the combination with said structure and the mechanism of support means for the one newspaper and said wrapper and having a pair of opposed, central, spaced margins presenting an opening therebetween in alignment with the central portions of the one newspaper and said wrapper; a pair of horizontal oppositely rotatable components positioned below said opening in the support means and adapted to receive the newspaper and said wrapper therebetween during rotation of said components; trough means underlying said components for receiving and supporting the folded newspaper and wrapper as the latter are moved downwardly by said components during rotation thereof, one of said components having a cut-out portion in the periphery thereof defining notch means located to clear the upper margin of said folded newspaper and the wrapper after the latter have been shifted downwardly by said components into engagement with said trough means; mechanism overlying said support means and including a folding element mounted for oscillatory movement through said opening in the support means and into proximity to said rotatable components, said element being disposed to engage said one newspaper while the latter is on said support means; and means operably coupled to said mechanism for oscillating the folding element whereby upon movement of the element toward said support means, the element engages the central portion of said one newspaper and effects transverse folding of the latter in half as the newspaper and the wrapper underlying the same, are pushed through the opening in said support means and into disposition whereby the components receive the folded newspaper and wrapper therebetween and shift the latter into a location clearing said folding element.

16. Apparatus as set forth in claim 15 wherein is provided pressure means adjacent said trough and disposed to engage the outer face of one portion of the wrapper for holding the latter against the proximal face of said folded newspaper as the latter is moved downwardly by said components into a position supported by said trough means.

17. In apparatus for packaging newspapers having a pair of initial transverse folds therein and a wrapper over each newspaper and covering the outer face thereof, said apparatus comprising a platform for supporting said folded newspaper and wrapper and including a pair of relatively swingable plates normally positioned in generally coplanar relationship and having opposed proximal margins movable simultaneously away from each other during swinging movement of respective plates; means connected to said swingable plates for normally maintaining the same in coplanar disposition with said margins thereof in relatively close relationship for supporting a newspaper; a folding member normally overlying said plates and provided with a lower margin adapted to engage the central portions of the folded newspaper and wrapper transversely thereof in substantial alignment with the space between said opposed margins of the swingable plates; and means operably coupled to said member for shifting the latter through a path of travel downwardly between said swingable plates to thereby again fold the newspaper and wrapper transversely thereof as the plates swing away from each other and the member shifts the folded newspaper into a location below and clearing said plates.

18. Apparatus as set forth in claim 17 wherein is provided generally U-shaped means below said swingable plates for receiving the folded newspaper therebetween upon folding of the same by said member and adapted to retain the folded newspaper and wrapper upon return of the folding member to the initial disposition thereof.

19. Apparatus as set forth in claim 18 wherein said U-shaped means comprises a plurality of resilient fingers extending toward said swingable plates, the uppermost extremities of opposed fingers being in closer spaced relationship than the normal thickness of the newspaper and wrapper upon folding of the latter by said folding member.

20. Apparatus as set forth in claim 18 wherein the wrapper is of greater transverse width than the width of the folded newspaper, and wherein is included rotatable structure disposed to receive the outer portions of the wrapper extending beyond respective extremities of the newspaper for crimping such outwardly extending portions of the wrapper as the newspaper is shifted into said U-shaped means, and power means coupled to said structure for turning the same in a direction to twist the outer portions of said wrapper while the newspaper is held stationary.

21. Apparatus as set forth in claim 20, wherein said structure comprises a pair of generally J-shaped members each having a relatively short leg integral with a relatively long leg, said legs converging as the zone of juncture thereof is approached, and initially disposed in locations to receive the outer portions of the wrapper between said legs.

22. Apparatus as set forth in claim 18 wherein is provided mechanism operably connected to said U-shaped means for rotating the latter away from said swingable plates, and means associated with said U-shaped means for ejecting the folded newspaper therefrom after the U-shaped means have been moved away from said swingable plates.

23. Apparatus as set forth in claim 22 wherein the wrapper is of greater transverse width than the width of the folded newspaper, and wherein is included rotatable structure disposed to receive the outer portions of the wrapper extending beyond respective extremities of the newspaper for crimping such outwardly extending portions of the wrapper as the newspaper is shifted into said U-shaped means, and power means coupled to said structure for turning the same in a direction to twist the outer portions of said wrapper while the newspaper is held stationary, said power means turning the structure in a direction opposite to and simultaneously with movement of said U-shaped means away from said swingable plates.

24. Apparatus as set forth in claim 18 wherein is provided means adjacent said U-shaped means for applying a securing member to the folded newspaper while the latter is disposed within said U-shaped means.

25. Apparatus as set forth in claim 24 wherein said means for applying a securing member to the folded newspaper includes a supply of tape having an adhesive thereon, means for severing a predetermined length of such tape from the outer free end thereof, and means for pressing the adhesive face of said tape against the wrapper over the folded newspaper and across the outer exposed margin of said wrapper.

26. Apparatus as set forth in claim 25, wherein is provided means associated with said U-shaped means for ejecting the folded newspaper therefrom, after the tape has been applied to said wrapper, and means adjacent said U-shaped means and engageable with the length of tape on said folded newspaper for smoothing the length of tape against the outer face of the wrapper as the folded newspaper is ejected from said U-shaped means.

27. Apparatus as set forth in claim 18, wherein said U-shaped means comprises a plurality of flexible fingers extending toward said swingable plates, the upper extremities of said fingers being in closer spaced relationship than the normal transverse width of said folded newspaper, and means mounting the fingers for movement toward and away from each other to permit selective variation of the distance between said fingers to accommodate papers of varying initial thickness.

28. In apparatus for packaging newspapers and provided with mechanism for folding each newspaper transversely thereof in half a plurality of times at a number of successive folding stations and in conjunction with placement of a wrapper thereover to protect the outer surface of the folded newspaper, the combination with said mechanism for folding the newspaper and the wrapper thereover, of means for receiving the folded newspaper from the last folding station of said mechanism; power means operably coupled to said folded newspaper receiving means; means associated with said folded newspaper receiving means for ejecting the newspaper therefrom when the folded newspaper receiving means has been shifted away from the disposition at which the same initially receives the folded newspaper; tape applying means adjacent said folded newspaper receiving means and including structure disposed to maintain the outer free end of the tape in a position to engage the wrapper over the folded newspaper during movement of the latter into said newspaper receiving means; means for severing the tape in predetermined spaced relationship from the outer free end thereof after the free end of the tape has engaged said wrapper over the folded newspaper; means for actuating said tape severing means in response to shifting of said folded newspaper receiving means into the newspaper ejecting position thereof; and means adjacent said folded newspaper receiving means for smoothing the tape against the outer surface of the wrapper in a position across the outer extremity of said wrapper as the folded newspaper is ejected from said folded newspaper receiving means.

29. Apparatus as set forth in claim 28, wherein said tape severing means includes a knife disposed to engage and sever the tape in spaced relationship to the point at which the free end of the tape is shifted into engagement with the wrapper over the folded newspaper, means for maintaining the tape in a taut condition during severing thereof with said knife, and means for smoothing the free end of the severed length of tape against the wrapper over the folded newspaper and across the exposed extremity of said wrapper.

30. Apparatus as set forth in claim 29, wherein said knife is provided with an outer sharp edge disposed to engage and sever the tape, and a sharp projection extending outwardly from said edge to initially engage and pierce the tape to hold the latter in proper position and under necessary tension during shifting of the knife through a path of travel to sever the tape.

31. In apparatus for packaging a folded newspaper, said apparatus comprising a platform for supporting said folded newspaper, said platform being shiftable in a direction to clear the folded newspaper when pressure is placed on the upper surface thereof; and means disposed to grasp and hold the leading margin of the folded newspaper when the latter is positioned on said platform and shiftable along a generally initially arcuate path and thence along a rectilinear path in a direction to roll the leading margin of said folded newspaper toward the trailing margin of the paper to thereby effect transverse folding of the newspaper in half and simultaneously with downward movement of the folded newspaper as the platform shifts to clear said folded newspaper.

32. Apparatus as set forth in claim 31 wherein said platform includes a pair of swingable plates having opposed proximal margins movable away from each other during swinging movement of respective plates and means connected to said swingable plates for normally maintaining the same in disposition for supporting a newspaper, said means for engaging the leading edge of the newspaper to effect folding thereof including a tucker blade cooperable with the plate adjacent the leading margin of the newspaper when the latter is supported by said platform, to thereby effect transverse folding of the newspaper in half during shifting movement of said tucker blade and as the plate cooperating therewith shifts in a direction to clear said paper.

33. Apparatus as set forth in claim 31 wherein said means for effecting folding of the newspaper includes a swingable plate positioned to receive the newspaper to be folded, and a tucker blade overlying asid plate and shiftable through a path of travel to cause the leading edge of the newspaper to be clamped between the lower margin of the tucker blade and the plate thereunder whereby during shifting of the tucker blade toward and past the plate, the newspaper is folded in half by said blade in cooperation with said plate and the remaining portion of said platform.

34. Apparatus as set forth in claim 33 wherein is provided arm means pivotally secured to and carrying said tucker blade, means coupled to said tucker blade and the arms respectively for biasing the tucker blade through an angular path of travel about the axis of pivoting thereof on said arm means, and stop means on said arm means for limiting pivoting of said blade means with respect to said arm means.

35. Apparatus as set forth in claim 34 wherein said tucker blade is shiftable through a substantially J-shaped path of travel with the tucker blade being movable through an initially arcuate path to effect folding of the newspaper and through a subsequent rectilinear path to shift the folded newspaper into disposition below said plate and the remaining portion of the platform initially supporting the same.

36. In apparatus for packaging newspapers having an initial transverse fold therein, the combination of structure for receiving a number of such newspapers in stacked relationship; second structure for receiving a stack of protective wrappers for said newspapers; means shiftable between the overlapped folds of one of the newspapers and engageable with the transverse zone of interconnection of the folds for shifting said newspaper toward a location remote from said stack of newsapers; means engageable with one of the wrappers in said stack thereof for shifting said one wrapper to said location and in alignment with said one newspaper while the latter is at said location; and an elongated bar above the wrappers adjacent the edge thereof remote from said location and mounting a number of normally downwardly projecting piercing elements engaging said one wrapper proximal to said edge of the same, extending through the latter and piercing the edge of the wrapper therebelow for preventing the wrapper beneath said one wrapper from being displaced from said second structure as said one wrapper is being shifted toward said location.

References Cited in the file of this patent

UNITED STATES PATENTS

| | | |
|---|---|---|
| 601,741 | Waite et al. | Apr. 5, 1898 |
| 696,021 | Elliott | Mar. 25, 1902 |
| 722,879 | Owens | Mar. 17, 1903 |
| 1,079,012 | Kempf | Nov. 18, 1913 |
| 1,405,188 | Coombs | Jan. 31, 1922 |
| 1,618,972 | Bassan | Mar. 1, 1927 |
| 2,030,880 | Kleineberg | Feb. 18, 1936 |
| 2,274,745 | Schultz et al. | Mar. 3, 1942 |
| 2,521,529 | Mauney | Sept. 5, 1950 |
| 2,783,596 | Metz | Mar. 5, 1957 |
| 2,895,272 | Krukonis | July 21, 1959 |
| 3,001,351 | Brook et al. | Sept. 26, 1961 |